(12) United States Patent
Matsuyama et al.

(10) Patent No.: US 7,977,408 B2
(45) Date of Patent: Jul. 12, 2011

(54) RECORDING INK, INK SET, INK CARTRIDGE, INK RECORD, INKJET RECORDING APPARATUS AND INKJET RECORDING METHOD

(75) Inventors: Akihiko Matsuyama, Isehara (JP); Masanori Hirano, Atsugi (JP); Hiroshi Adachi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 883 days.

(21) Appl. No.: 11/815,512

(22) PCT Filed: Feb. 2, 2006

(86) PCT No.: PCT/JP2006/302199
§ 371 (c)(1),
(2), (4) Date: Oct. 30, 2007

(87) PCT Pub. No.: WO2006/083000
PCT Pub. Date: Aug. 10, 2006

(65) Prior Publication Data
US 2009/0035468 A1    Feb. 5, 2009

(30) Foreign Application Priority Data

Feb. 4, 2005 (JP) ................ 2005-029382
Sep. 28, 2005 (JP) ................ 2005-283101

(51) Int. Cl.
*C09D 11/10* (2006.01)
(52) U.S. Cl. ............ 523/160; 347/1; 347/86; 347/100; 524/88; 524/92; 524/94; 106/31.6; 106/31.78

(58) Field of Classification Search .............. 523/160; 347/1, 100; 106/31.13, 31.78; 524/88, 92, 524/94
See application file for complete search history.

(56) References Cited

U.S. PATENT DOCUMENTS

| | | | |
|---|---|---|---|
| 2002/0096085 A1* | 7/2002 | Gotoh et al. | 106/31.86 |
| 2004/0138337 A1* | 7/2004 | Hasegawa et al. | 523/160 |
| 2005/0284329 A1* | 12/2005 | Jackson et al. | 106/31.6 |
| 2007/0197685 A1 | 8/2007 | Aruga et al. | |

FOREIGN PATENT DOCUMENTS

| | | |
|---|---|---|
| EP | 0 933 406 A1 | 8/1999 |
| EP | 1 403 334 A1 | 3/2004 |
| JP | 8 239610 | 9/1996 |
| JP | 9 263722 | 10/1997 |

(Continued)

OTHER PUBLICATIONS

U.S. Appl. No. 11/575,403, filed Mar. 16, 2007, Matsuyama.

*Primary Examiner* — David Wu
*Assistant Examiner* — Vu A Nguyen
(74) *Attorney, Agent, or Firm* — Oblon, Spivak, McClelland, Maier & Neustadt, L.L.P.

(57) ABSTRACT

It is an object of the present invention to provide a recording ink which contains at least a pigment, a dispersant, a water-soluble solvent, a wetting agent and water, wherein the pigment contains at least one of diketopyrrolopyrrole red pigment and phthalocyanine green pigment in order to obtain a recording ink and ink set which excel in discharge stability with no head clogging during printing and can obtain high quality images with good color tone on the regular paper as well as on an exclusive recording paper; and ink cartridge, ink record, inkjet recording apparatus and inkjet recording method which utilize the recording ink and ink set respectively.

18 Claims, 7 Drawing Sheets

FOREIGN PATENT DOCUMENTS

| | | |
|---|---|---|
| JP | 99 05230 | 2/1999 |
| JP | 2002 88286 | 3/2002 |
| JP | 2003 94793 | 4/2003 |
| JP | 2003 268274 | 9/2003 |
| JP | 2003 276300 | 9/2003 |
| JP | 2003 335987 | 11/2003 |
| JP | 2004 155830 | 6/2004 |
| JP | 3618493 | 11/2004 |
| JP | 3625595 | 12/2004 |
| WO | WO 2006/012142 A1 | 2/2006 |

* cited by examiner

C→Y

Y→C

RECORDING INK, INK SET, INK CARTRIDGE, INK RECORD, INKJET RECORDING APPARATUS AND INKJET RECORDING METHOD

TECHNICAL FIELD

The present invention relates to recording ink and ink set which excel in discharge stability with no head clogging during printing and can obtain high quality images with good color tone on the regular paper as well as on an exclusive recording paper; ink cartridge, ink record, inkjet recording apparatus and inkjet recording method which utilize the recording ink and ink set respectively.

BACKGROUND ART

Recently, inkjet printers have been rapidly diffused for its advantageous properties such as low noise and low running cost and color printers which are printable on the regular paper have been actively put into the market. However, satisfying all the properties required such as color reproducibility, endurance, light stability, drying property, feathering and color bleed of images, duplex printing ability, discharge stability, and the like is very difficult and inks are therefore selected depending on the preferred but property corresponding to the purpose.

The inks used for inkjet printers in general consist mainly of water and contain colorant and humectant such as glycerin, and the like for anticlogging. Dyes are used as colorant for its excellent color-producing property and stability. However, light stability and waterproofness, etc. of the images produced by dye-based inks are not satisfactory. Waterproofness may be improved somehow by upgrading the inkjet recording paper containing ink absorber layer, however, it is unsatisfactory for the regular paper.

Recently, a pigment ink in which a pigment such as organic pigment, carbon black, and the like instead of dyes is dispersed in water or an aqueous medium is being investigated for use. Examples of general method for producing pigment dispersion ink include high speed agitation by homogenizers, kneading-dispersion machines using balls such as bead mill or ball mill, kneading-dispersion machines using shear force such as roll mill, a method for preparing dispersion liquid using ultrasound dispersion machines, etc. after dissolving a dispersant in an aqueous medium and sufficiently moistening by adding pigment particles. For example, a method for improving discharge stability in which an organic pigment is reduced to particles of 50 nm or less in diameter using specific dispersant is disclosed in Patent Literatures 2 and 3. And an ink for inkjet printing using specific organic pigment and anionic dispersant is disclosed in Patent Literature 4.

Recording inks for inkjet printing with pigment particles of 50 nm to 150 nm in the volume average particle diameter are being used in general. If the particle is larger than this size, it causes clogging of nozzles and if it is smaller, storage stability is significantly deteriorated. There are various dispersants from surfactants of low molecular mass to polymer dispersants of high molecular mass. A polymer dispersant excels in storage stability; however, it is difficult to reduce the volume average particle diameter of a pigment particle to less than 150 nm. On the other hand, with a dispersant of low molecular mass, it is possible to reduce the volume average particle diameter of a pigment particle to 50 nm to 100 nm; however, storage stability may not be satisfactory. Methods for adding water-soluble polymers are proposed in Patent Literatures 1 and 6 as a method to compensate for the lack of storage stability of dispersant of low molecular mass.

And others include surface reforming pigment ink in which the surface of the pigment particles are modified with carboxyl group, carbonyl group, sulfone group and hydroxyl group, and the like to give hydrophilic property for stable dispersion. A surface reforming carbon black, a black-based pigment ink in which pigment particles can be stably dispersed by introducing hydrophilic groups to the surface of carbon black, has been developed and put in practical use. A color pigment which can be stably dispersed has also been developed for color pigment inks. However, these surface reforming pigment inks have disadvantages of insufficient scratch resistance and waterproofness on the regular paper and the exclusive gloss paper.

An inkjet ink utilizing a dispersing element of micro-capsule or emulsion type by which the pigment particles are coated with resin has been proposed. Since the pigment particles are coated solidly by resin, dispersion may be stable for a long period and the discharge stability may improve somewhat, however, it is difficult to produce a dispersion particle of small particle diameter suitable for inkjet printing and there is a problem of high cost because of complicated production process.

For example, an approach of adding fluorochemical surfactant to the ink and letting it spread broadly and uniformly in a concentric fashion after an ink droplet is applied on the paper to improve filling of the spaces between dots of ink droplets and saturation in order to improve saturation degradation of printed images caused by large diameter of dispersion particles, has been proposed in Patent Literatures 7 and 8.

When printing in red color with magenta and yellow inks, a phenomenon may be observed in that the color tone differs depending on the order of ink applied on the paper. The phenomenon becomes prominent in the inkjet method in which printing is performed by scanning an ink discharge head because application order is reversed between outward and homeward path and it is not acceptable especially in a region of high concentration of pigment inks. Similarly, when printing in green color with yellow and cyan inks or when printing in blue color with cyan and magenta inks, bidirectional color difference may also occur. This has been handled by setting a limitation on the bidirectional printing making the printing speed to slow down.

Therefore in the Patent Literature 4, it is stated that the bidirectional color difference can be decreased by utilizing an ink having at least four different hue as a color ink. However, red, green and blue inks are not used in this proposal and it is of different ink set formation.

Moreover, when secondary colors of red, green and blue are formed by using yellow, magenta and cyan inks, the text looks blurred because all the dots are not filled and spaces are left at the tone exceeding total amount control. When yellow ink is used for the secondary color, the text still looks blurred because of the low visibility of yellow color and the text quality is deteriorated. Furthermore, when secondary color is formed, two kinds of inks are applied in the same dot to form one tone and double amount of total application is needed to express the same tone as a single color ink. However, because the tone exceeding total amount control cannot be expressed, the number of tone is lessened and therefore not favorable.

A red ink can be produced by simply mixing magenta and yellow inks. Bidirectional color difference, text quality and tone property can be improved by utilizing the mixed red ink better than utilizing two different colors. However, there is no difference in saturation between the mixed red ink and two different colors; therefore it is impossible to expand the region of color reproduction.

Moreover, further improvement of saturation is possible by utilizing single red pigment. Particularly, the red ink of high saturation can be prepared by diketopyrrolopyrrole red pigment (Patent Literature 5). Similarly, it is possible to achieve a color tone of high saturation for green inks by utilizing single phthalocyanine green pigment better than applying two colors. However, there is an issue of tone gradually moving off to the yellow side as the image density and saturation are increased when utilizing an ink of diketopyrrolopyrrole red pigment. This phenomenon becomes distinguishable around 90% ink duty and the hue transition becomes greater in a region of high density and saturation.

It is difficult to perform a stable dispersion in an aqueous medium when single red pigment, green pigment and in particular diketopyrrolopyrrole red pigment and phthalocyanine green pigment are utilized. When they are employed as inks for inkjet printing, particle diameter must be as small as approximately 100 nm or less and it is necessary to select based on the compatibility with dispersant and pigment or with additive water-soluble solvent in order to retain the ink of small particle diameter under stable condition for extended period.

Therefore, the recording ink and ink set in which diketopyrrolopyrrole red pigment and phthalocyanin green pigment with excellent color development can be stably dispersed in an aqueous medium; properties remain the same after long storage; and are suitable as red and green inks with appropriate discharge stability by inkjet have not been made available in the present situation.

[Patent Literature 1] Japanese Patent (JP-B) No. 3625595 (Japanese Patent Application Laid-Open (JP-A) No. 09-263720)
[Patent Literature 2] JP-A No. 09-263722
[Patent Literature 3] JP-A No. 2002-088286
[Patent Literature 4] JP-A No. 2003-276300
[Patent Literature 5] JP-A No. 08-239610
[Patent Literature 6] JP-B No. 3618493
[Patent Literature 7] JP-A No. 2003-268274
[Patent Literature 8] JP-A No. 2003-335987

DISCLOSURE OF INVENTION

It is an object of the present invention to provide a recording ink and ink set in which diketopyrrolopyrrole red pigment and phthalocyanin green pigment with excellent color development can be stably dispersed in an aqueous medium; properties remain the same after long storage; and are suitable as red and green inks with appropriate discharge stability by inkjet; and ink cartridge, ink record, inkjet recording apparatus and inkjet recording method which utilize the recording ink and ink set respectively.

Furthermore, it is an object of the present invention to provide a recording ink and ink set which are capable of correcting text quality and tone property degradation when secondary colors are utilized; improving printing speed by reducing bidirectional color difference; and has high saturation and wide region of color reproduction with no hue change by adhesive amount even when single red pigment is utilized; and ink cartridge, ink record, inkjet recording apparatus and inkjet recording method which utilize the recording ink and ink set respectively.

The recording ink according to the present invention contains a pigment, a dispersant, a water-soluble solvent, a wetting agent, and water wherein the pigment contains at least one of diketopyrrolopyrrole red pigment and phthalocyanine green pigment. By the present invention, it is possible to provide the recording inks such as red and green inks having appropriate discharge stability by inkjet in which diketopyrrolopyrrole red pigment and phthalocyanin green pigment with excellent color development can be stably dispersed in an aqueous medium and properties remain the same after long storage.

The recording ink according to the present invention is preferably having an aspect wherein the diketopyrrolopyrrole red pigment is at least one selected from C. I. pigment red 254, C. I. pigment red 255, C. I. pigment red 264 and C. I. pigment red 272, wherein the phthalocyanine green pigment is at least one of C. I. pigment green 7 and C. I. pigment green 36, and wherein the dispersant is at least one of compounds expressed by following Structural Formulas (11) and (12).

$$A^1\text{-O}—(CH_2CH_2O)_k—SO_3M^1 \quad \text{Structural Formula (11)}$$

In Structural Formula (11), $A^1$ represents one of alkyl group having carbon number 8 to 12 which may be branched, aryl group having carbon number 6 to 18, benzyl group, styrenated phenol group, distyrenated phenol group and β-naphthyl group. "k" represents an integer of 5 to 30. $M^1$ represents one of alkali metal, ammonium, phosphonium and alkanolamine.

$$A^1\text{-O}—(CH_2CH_2O)_i—H \quad \text{Structural Formula (12)}$$

In Structural Formula (12), $A^1$ represents one of alkyl group having carbon number 8 to 12 which may be branched, aryl group having carbon number 6 to 18, benzyl group, styrenated phenol group, distyrenated phenol group and β-naphthyl group. "i" represents an integer of 20 to 60.

It is also preferable for the recording ink according to the present invention to have an aspect wherein the loadings of the dispersant is 1 part by mass to 100 parts by mass based on 100 parts by mass of the pigment, wherein the recording ink contains water-dissolved material or water-dispersed material of at least one of acrylic resin, methacrylic resin, polyurethane resin and polyester resin, wherein the mass-average molecular weight of the resin is 5,000 to 100,000 and the acid value is 50 KOHmg/g to 200 KOHmg/g, wherein the mass of dispersant (X) and the mass of solid content (Y) of water-dissolved material or water-dispersed material of at least one of acrylic resin, methacrylic resin, polyurethane resin and polyester resin in the recording ink satisfies the next equation, $Y/X \leq 1$, wherein the wetting agent is one of 2-ethyl-1,3-hexanediol and 2,2,4-trimethyl-1,3-pentanediol, wherein the water-soluble solvent is at least one selected from glycerin, diethylene glycol, 1,3-butanediol, 3-methyl-1,3-butanediol, triethylene glycol, 1,6-hexanediol, propylene glycol, 1,5-pentanediol, dipropylene glycol and trimethylol propane, wherein the recording ink contains a fluorochemical surfactant and the fluorochemical surfactant is at least one of perfluoroalkyl sulfonates, perfluoroalkyl carbonates, perfluoroalkyl ethyleneoxide adducts and perfluoroalkyl betaines, and wherein the recording ink contains a polymer particle with the volume average particle diameter of 5 nm to 200 nm having a film-forming performance after printing on a recording medium wherein the minimum film-forming temperature is 30° C. or less.

The ink set according to the present invention contains at least the recording ink according to the present invention wherein the red ink of 90% or more duty and the magenta ink of less than 10% duty are used simultaneously for printing red color of 90% or more ink duty, and the red ink of 90% or more duty and the yellow ink of less than 10% duty are used simultaneously for printing red color of less than 90% ink duty.

The ink cartridge according to the present invention contains a recording ink according to the present invention in a container.

The ink cartridge is suitably used for printers of inkjet recording.

It is possible to obtain high quality images with good color tone on the regular paper as well as on an exclusive recording paper with excellent discharge stability with no head clogging during printing by performing printing using the ink contained in the ink cartridge.

The inkjet recording apparatus according to the present invention contains an ink drop discharge unit configured to discharge recording ink drops to record an image by applying stimulation to the recording ink according to the present invention. In the inkjet recording apparatus, an image is formed by the ink drop discharge unit which discharges the recording ink drops by applying energy to the recording ink of the present invention. As a result, it is possible to form high quality images with good color tone on the regular paper as well as on an exclusive recording paper with excellent discharge stability with no head clogging during printing.

The inkjet recording apparatus according to the present invention is preferably having an aspect wherein the stimulation is at least one selected from heat, pressure, vibration and light.

The inkjet recording method according to the first embodiment of the present invention contains ink drop discharge to record an image by applying stimulation to the recording ink of the present invention.

The inkjet recording method according to the second embodiment of the present invention contains ink drop discharge to record an image by applying stimulation to each recording ink in the ink set of the present invention.

One of the inkjet recording methods according to the first and second embodiment of the present invention is preferably having an aspect wherein the stimulation is at least one selected from heat, pressure, vibration and light.

The inkjet recording method according to the second embodiment of the present invention is preferably having an aspect wherein the red ink of 90% or more duty and the magenta ink of less than 10% duty are used simultaneously for printing red color of 90% or more ink duty, and the red ink of 90% or more duty and the yellow ink of less than 10% duty are used simultaneously for printing red color of less than 90% ink duty.

The ink record according to the present invention contains an image recorded on a recording medium using the recording ink according to the present invention. The high quality images with good color tone are retained on the recording medium of the ink record.

Figure 1:
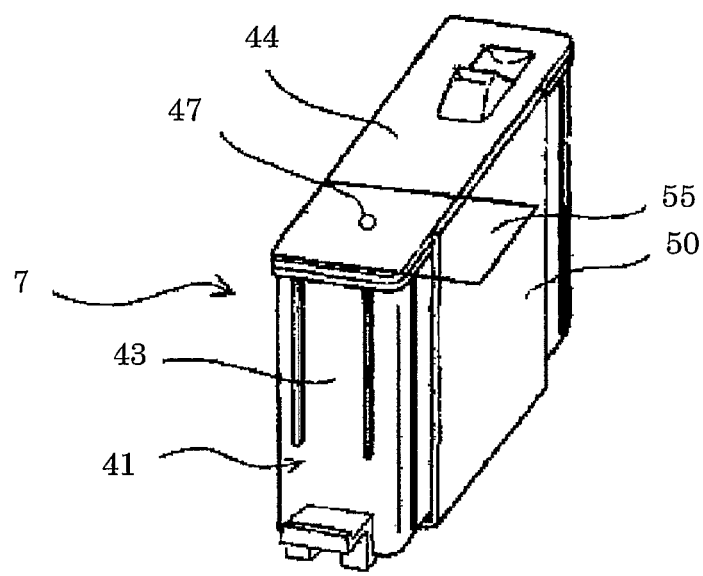
FIG. 1 is an external perspective view showing an exemplary ink cartridge prior to loading in the recording apparatus of the present invention.

BEST MODE FOR CARRYING OUT THE INVENTION (Recording Ink)

The recording ink of the present invention contains at least a pigment, a dispersant, a water-soluble solvent, a wetting agent and water and also contains water-soluble and/or water-dispersable resin, polymer particle, surfactant and other elements as necessary.

-Pigment-

The pigment contains at least one of diketopyrrolopyrrole red pigment and phthalocyanine green pigment and further contains other pigments as necessary.

The diketopyrrolopyrrole red pigment is preferably at least one selected from C. I. pigment red 254, C. I. pigment red 255, C. I. pigment red 264 and C. I. pigment red 272.

The phtahlocyanine green pigment is preferably at least one of C. I. pigment green 7 and C. I. pigment green 36.

Other pigments are not particularly limited and may be selected accordingly. Examples of pigment for black color include carbon blacks (C. I. pigment black 7) such as firness black, lamp black, acetylene black, channel black, and the like, copper, iron (C. I. pigment black 11), metals such as titanic oxide, organic pigments such as aniline black (C. I. pigment black 1).

Carbon black is preferable for the pigment for black color. The carbon black excels in color tone, waterproofness, light stability and dispersion stability and is inexpensive.

Examples of pigment for colors include C. I. pigment yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 138, 150, 151, 153, 183; C. I. pigment orange 5, 13, 16, 17, 36, 43, 51; C. I. pigment violet 1 (rhodamine lake), 3, 5:1, 16, 19, 23, 38; C. I. pigment blue 1, 2, 15 (phthalocyanine blue), 15:1, 15:2, 15:3 (phthalocyanine blue), 16, 17:1, 56, 60, 63, and the like.

Of these pigments, the one having high affinity with water is preferably used.

Other pigments such as graft pigment of which the surface of a pigment such as carbon is treated with resin, etc. and made dispersible in water or processed pigment of which the surface of a pigment such as carbon is added with functional group such as sulfone group or carboxyl group, etc. and made dispersible in water are also usable.

Moreover, it may be a pigment contained in a micro-capsule and made dispersible in water.

The volume average particle diameter of the pigment in the recording ink is preferably 20 nm to 200 nm and more preferably 50 nm to 150 nm. The loadings of solid content of dispersion particles in the ink with pigment and dispersant combined is preferably 2% by mass to 20% by mass and more preferably 4% by mass to 15% by mass.

The loadings of the pigment in the recording ink is not limited and may be adjusted accordingly. It is preferably 0.5% by mass to 25% by mass and more preferably 2% by mass to 15% by mass. When the loadings is less than 0.5% by mass, the image density is decreased and the image would be without contrast. When the loadings is more than 25% by mass, it is difficult to maintain dispersion stability of the colorant and likely to cause clogging of nozzles, etc. and reliability may be deteriorated.

-Dispersant-

The dispersant is not particularly limited and may be selected from dispersants used for preparing pigment dispersion liquid accordingly. Examples include polyacrylic acid, polymethacrylic acid, acrylic acid-acrylonitrile copolymer, vinyl acetate-acrylic acid ester copolymer, acrylic acid-acrylic acid alkylester copolymer, styrene-acrylic acid copolymer, styrene-methacrylic acid copolymer, styrene-acrylic acid-acrylic acid alkylester copolymer, styrene-methacrylic acid-acrylic acid alkylester copolymer, stylene-α-methylstyrene-acrylic acid copolymer-acrylic acid alkylester copolymer, styrene-maleic acid copolymer, vinylnaphthalene-maleic acid copolymer, vinyl acetate-ethylene copolymer, vinyl acetate-aliphatic acid vinyl ethylene copolymer, vinyl acetate-maleic acid ester copolymer, vinyl acetate-crotonic acid copolymer, vinyl acetate-acrylic acid copolymer, compounds expressed by following Structural Formulas (11) and (12), and the like. These dispersants can be used alone or in combination.

  Structural Formula (11)

In Structural Formula (11), $A^1$ represents one of alkyl group having carbon number 8 to 12 which may be branched, aryl group having carbon number 6 to 18, benzyl group, styrenated phenol group, distyrenated phenol group and β-naphthyl group. "k" represents an integer of 5 to 30. $M^1$ represents one of alkali metal, ammonium, phosphonium and alkanolamine.

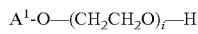  Structural Formula (12)

In Structural Formula (12), $A^1$ represents one of alkyl group having carbon number 8 to 12 which may be branched, aryl group having carbon number 6 to 18, benzyl group, styrenated phenol group, distyrenated phenol group and β-naphthyl group. "i" represents an integer of 20 to 60.

Of these, it is preferable to use one of the compounds expressed by Structural Formulas (11) and (12).

Examples of the compound expressed by Structural Formula (11) include a compound expressed by following Structural Formula (1). In particular, it is preferably the compound expressed by Structural Formula (A).

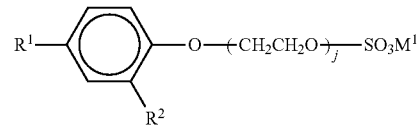

Structural Formula (1)

In Structural Formula (1), $R^1$ represents one of alkyl group having carbon number 1 to 12 which may be branched, benzyl group, styryl group and distyryl group. $R^2$ represents one of hydrogen atom, alkyl group having carbon number 1 to 12 which may be branched, benzyl group and styryl group. "j" represents an integer of 5 to 20. $M^1$ represents one of alkali metal, ammonium, phosphonium and alkanolamine.

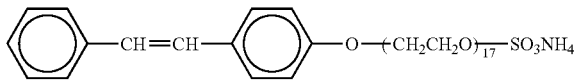

Structural Formula

Examples of compound expressed by Structural Formula (12) include polyoxyethylene laurylether, and the like. Of these, compounds expressed by following Structural Formulas (13) and (13') are preferable.

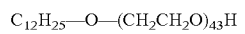  Structural Formula (13)

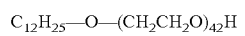  Structural Formula (13')

The loadings of the dispersant is preferably 1 part by mass to 100 parts by mass and more preferably 10 parts by mass to 50 parts by mass based on 100 parts by mass of the pigment. If the loadings of the dispersant is too low, pigment may not be atomized satisfactory and if it is too high, excess element not attached to the pigment effect the ink properties leading to image blurring or deterioration of waterproofness and wear resistance.

-Water-Soluble and/or Water-Dispersible Resin-

Storage stability of the recording ink of the present invention may be improved by adding at least one of water-soluble or water-dispersible material of acrylic resin, methacrylic resin, polyurethane resin and polyester resin. It is possible to add resin when dispersing pigment using a dispersion machine such as bead mill or atrighter, etc. or together with water-soluble solvent or surfactant, etc. when preparing the recording ink. It is preferable to add resin when preparing the recording ink.

The acrylic resin is not particularly limited and may be selected accordingly. Examples include polyacrylic acid, acrylic acid-acrylonitrile copolymer, vinyl acetate-acrylic acid ester copolymer, acrylic acid-acrylic acid alkylester copolymer, styrene-acrylic acid copolymer, styrene-acrylic acid-acrylic acid alkylester copolymer, stylene-α-methylstyrene-acrylic acid copolymer, acrylic acid alkylester copolymer, vinyl acetate-acrylic acid copolymer, and the like.

The methacrylic resin is not particularly limited and may be selected accordingly. Examples include polymethacrylic acid, styrene-methacrylic acid copolymer, styrene-methacrylic acid-acrylic acid alkylester copolymer, stylene-α-methylstyrene-acrylic acid copolymer, and the like.

The polyurethane resin is not particularly limited and may be selected accordingly. Examples include polyurethane resin made soluble in water or dispersed in water by introducing hydrophilic element such as carboxyl group, sulfone group, and the like in urethane skeleton.

Commercially available polyurethane resin may be used and examples include Hydran HW-970 and HW-940 by Dainippon Ink And Chemicals, Inc., Takelac W-6010, W-6061 and W-5025 by Mitsui Takeda Chemicals, Inc., SF-107M, SF-460, and the like by Dai-ichi Kogyo Seiyaku Co., Ltd.

The polyester resin is not particularly limited and may be selected accordingly. Examples include polyester resin made soluble in water or dispersed in water by introducing hydrophilic element such as carboxyl group, sulfone group, and the like into the side chain of polyester skeleton.

Commercially available polyester resin may be used and examples include Pesresin A-210, A-520, A-620, and the like by Takamatsu Oil & Fat Co., Ltd.

The mass-average molecular weight of these resins is preferably 5,000 to 100,000 and more preferably 10,000 to 30,000. If the mass-average molecular weight is more than 100,000, viscosity of the ink increases and the discharge from the inkjet nozzle may become unstable. When it is less than 5,000, it is not favorable because the effect on storage stability is lost.

Meanwhile, the mass-average molecular weight of the resin can be measured by Gel Permission Chromatography (GPC).

It is preferable that the relation between the mass of dispersant (X) and the mass of solid content (Y) of water-dissolved or water-dispersed material of acrylic resin, methacrylic resin, polyurethane resin and polyester resin in the recording ink of the present invention is $Y/X \leqq 1$ and more preferably $Y/X \leqq 0.01$ to $Y/X \leqq 0.5$. When the value of Y/X is larger than 1, viscosity of the ink is high possibly causing a problem during ink discharge.

-Water-Soluble Solvent-

The recording ink of the present invention uses water as a liquid medium; however, a water-soluble solvent mentioned below is used in order to prevent drying of the ink and to improve dispersion stability, etc. These solvents have favorable effects over solubility and prevention of injection-quality defects caused by water evaporation.

Water-soluble solvent is not particularly limited and may be selected accordingly. Examples include polyvalent alcohols, polyvalent alcohol alkyl ethers, polyvalent alcohol aryl ethers, nitrogen-containing heterocyclic compounds, amides, amines, sulfur-containing compounds, propylene carbonate, ethylene carbonate, other water-soluble solvents, and the like. These may be used alone or in combination.

Examples of polyvalent alcohols include glycerin, diethylene glycol, 1,3-butanediol, 3-methyl-1,3-butanediol, triethylene glycol, propylene glycol, dipropylene glycol, trimethylol propane, trimethylol ethane, ethylene glycol, tripropylene glycol, tetraethylene glycol, hexylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol, petriol, and the like.

Examples of polyvalent alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and the like.

Examples of polyvalent alcohol arylethers include ethylene glycol monophenyl ether, ethylene glycol monobenzyl ether, and the like.

Examples of nitrogen-containing heterocyclic compound include 2-pyrrolidone, N-methyl-2-pyrrolidone, N-hydroxyethyl-2-pyrrolidone, 1,3-dimethyl imidazoledione, ε-caprolactam, γ-butyrolactone, and the like.

Examples of amides include formamide, N-methyl formamide, N,N-dimethyl formamide, and the like.

Examples of amines include monoethanol amine, diethanol amine, triethanol amine, monoethyl amine, diethyl amine, triethyl amine, and the like.

Examples of sulfur-containing compound include dimethyl sulfoxide, sulfolane, thiodiethanol, and the like.

Other water-soluble solvents are preferably containing sugars. Examples of sugars include monomeric sugars, two sugars, oligosaccharides (including trisaccharide and tetrasaccharide) and polysaccharides. Specific examples include glucose, mannose, fructose, ribose, xylose, arabinose, galactose, maltose, cellobiose, lactose, sucrose, trehalose, malt triose, and the like. The polysaccharides stated here are defined as sugars in a broad sense, which contain matters that broadly exist in the realm of nature such as α-cyclodextrin, cellulose, and the like. Derivatives of these sugars include reducing sugar of the above sugars such as sugar alcohol expressed by General Formula: $HOCH_2(CHOH)nCH_2OH$ where "n" represents an integer of 2 to 5, saccharides such as aldonic acid, uronic acid, and the like, amino acid, thio acid, and the like. Of these, sugar alcohol is preferable and specific examples thereof include maltitol, sorbitol, and the like.

Of these water-soluble solvent, glycerin, diethylene glycol, 1,3-butanediol, 3-methyl-1,3-butanediol, triethylene glycol, 1,6-hexanediol, propylene glycol, 1,5-pentanediol, dipropylene glycol and trimethylol propane are particularly preferable in terms of storage and discharge stability.

The mass ratio of the pigment to the water-soluble solvent significantly affects the ink discharge stability from head. If the blending quantity of humectant is relatively small even though the solid content of pigment is large, water evaporation near the ink meniscus of the nozzle progresses and may result in discharge failure.

The loadings of water-soluble solvent in the recording ink is preferably 10% by mass to 50% by mass and more preferably 15% by mass to 35% by mass. The ratio of water-soluble solvent to the solid content of pigment particle including dispersant is preferably 0.67 to 12.5, more preferably 1.0 to 6.0 and most preferably 2.0 to 4.0. The recording ink within this range provides very favorable results in drying property, storage test or reliability test.

-Wetting Agent-

It is preferable to use polyol compounds having carbon number 8 to 11 or glycol ether compounds as wetting agent.

Examples of polyol compounds having carbon number 8 to 11 include 2,5-dimethyl-2,5-hexanediol, 2-ethyl-1,3-hexanediol, 2,2,4-trimethyl-1,3-pentandiol, and the like. Of these, 2-ethyl-1,3-hexanediol and 2,2,4-trimethyl-1,3-pentandiol are particularly preferable.

Examples of glycol ether compounds include polyvalent alcohol alkyl ether compounds, polyvalent alcohol arylether compounds, and the like.

Examples of polyvalent alcohol alkyl ether compounds include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and the like.

Examples of polyvalent alcohol arylether compounds include ethylene glycol monophenyl ether, ethylene glycol monobenzyl ether, and the like.

The loadings of wetting agent in the recording ink is not particularly limited and may be selected accordingly and it is preferably 0.5% by mass to 4% by mass.

-Surfactant-

The surfactant is not particularly limited and may be selected accordingly. Preferred examples include anionic surfactant and nonionic surfactant. Of these, fluorochemical surfactant is particularly preferable. A surfactant which does not impair the dispersion stability is selected depending on the combination of nature of color material, humectant and water-soluble organic solvent.

Examples of anionic surfactant include polyoxyethylene alkylether acetate, dodecylbenzen sulfonate, sodium laurylate, polyoxyethylene alkylether sulfonate, and the like.

Examples of nonionic surfactant include acetylene glycol surfactant, polyol, glycol ether, polyoxyethylene alkylether, polyoxyethylene alkylester, polyoxyethylene sorbitan fatty ester, polyoxyethylene alkylphenyl ether, polyoxyethylene alkylamine, polyoxyethylene alkylamide, acetylene glycol, and the like.

Examples of acetylene glycol surfactants include 2,4,7,9-tetramethyl-5-dithine-4,7-diol, 3,6-dimethyl-4-octine-3,6-diol, 3,5-dimethyl-1-hexane-3-ol, compounds expressed by following Structural Formula (7), and the like.

Commercially available acetylene glycol surfactants such as Surfynol 104, 82, 465, 485 or TG by Air Products and Chemicals, Inc. (U.S.A.) are usable and of these, Surfynol 465, 104 and TG are particularly preferable for exhibiting appropriate printing quality.

Preferred examples of anionic surfactant and nonionic surfactant include surfactants expressed by following Structural Formulas (2) to (7).

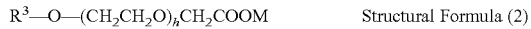

Structural Formula (2)

$R^3-O-(CH_2CH_2O)_hCH_2COOM$

In Structural Formula (2), $R^3$ represents alkyl group and the alkyl group having carbon number 6 to 14 which may be branched is preferable. "h" represents an integer of 3 to 12. "M" represents one selected from alkali metal ion, quaternary ammonium, quaternary phosphonium and alkanolamine.

Structural Formula (3)

In Structural Formula (3), $R^4$ represents alkyl group having carbon number 5 to 16 which may be branched. "M" represents one selected from alkali metal ion, quaternary ammonium, quaternary phosphonium and alkanolamine.

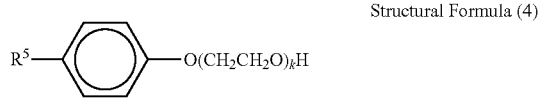

Structural Formula (4)

In Structural Formula (4), $R^5$ represents hydrocarbon group and examples include alkyl group having carbon number 6 to 14 which may be branched. "k" represents an integer of 5 to 20.

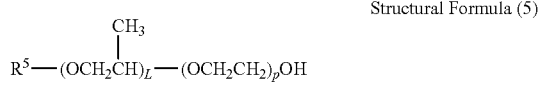

Structural Formula (5)

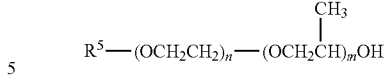

Structural Formula (5')

In Structural Formula (5) and (5'), $R^5$ represents hydrocarbon group. Each "L", "m", "n" and "p" represents an integer of 1 to 20. Examples of hydrocarbon group include alkyl group having carbon number 6 to 14 which may be branched.

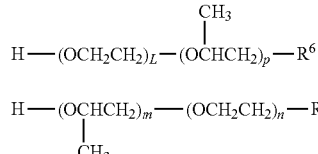

Structural Formula (6)

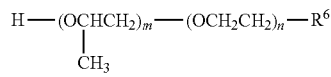

Structural Formula (6')

In Structural Formulas (6) and (6'), $R^6$ represents hydrocarbon group. Each "L", "m", "n" and "p" represents an integer of 1 to 20. Examples of hydrocarbon group include alkyl group having carbon number 6 to 14 which may be branched.

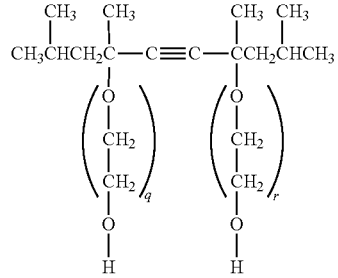

Structural Formula (7)

In Structural Formula (7), each "q" and "r" represents an integer of 0 to 40.

The fluorochemical surfactant is not particularly limited and examples include perfluoroalkyl sulfonates, perfluoroalkyl carbonates, perfluoroalkyl phosphoric ester, perfluoroalkyl ethyleneoxide adducts, perfluoroalkyl betaines, perfluoroalkylamine oxide, perfluoroalkylether compounds, and the like.

The commercially available fluorochemical surfactants are usable and examples include SURFLON S-111, S-112, S-113, S-121, S-131, S-132, S-141 and S-145 by Asahi Glass Co., Ltd., FLUORAD FC-93, FC-95, FC-98, FC-129, FC-135, FC-170C, FC-430 and FC-431 by Sumitomo 3M Limited, MEGAFAC F-470, F-1405 and F-474 by Dainippon Ink & Chemicals, Inc., ZONYL TBS, FSP, FSA, FSN-100, FSN, FSO-100, FSO, FS-300 and UR by DuPont Co., FT-110, 250, 251 and 400S by Neos Co., Ltd. Of these, FT-110, 250, 251 and 400S by Neos Co., Ltd. are preferable for appropriate printing quality, particularly the notable improvement of color developing ability and level dyeing property on the paper.

When the fluorochemical surfactant is used in the recording ink of the present invention, the surface tension of the recording ink is further decreased allowing the recording ink to easily penetrate into the recording medium after ink drops are applied to the recording medium such as paper. Moreover, it allows the fluorochemical surfactant to easily penetrate between aggregated particles in the recording ink and works well for reducing feathering or color bleed by separating aggregated particles and preventing aggregation.

-Polymer Particle-

The recording ink of the present invention contains polymer particles with the volume average particle diameter of 5 nm to 200 nm. The polymer particle is preferably having a film-forming performance after printing on a recording medium and the minimum film-forming temperature is 30° C. or less.

The film-forming performance of polymer particle means when a polymer particle is dispersed in water to form an emulsion, a resin film is formed as the moisture of aqueous emulsion evaporates.

In the ink composition into which the polymer particle is added, a film is formed by evaporating the volatile element to strongly fixate the color material (pigment) in the ink on the recording medium. Therefore it is possible to form an image of excellent scratch resistance and waterproofness.

Since the ink composition added with polymer particle forms a film at a room temperature, the minimum film-forming temperature of the polymer particle is preferably 30° C. or less and more preferably 10° C. or less.

The minimum film-forming temperature can be measured according to ISO 2115 or ASTM D2354.

The average particle diameter of polymer particle is preferably 5 nm to 200 nm and more preferably 10 nm to 100 nm.

The polymer particle is not particularly limited and may be obtained by known method. Examples include a method in which unsaturated vinyl monomer is put in water where polymerization catalyst and emulsifying agent exist and emulsion polymerization takes place.

The loadings of polymer particle is preferably 0.5% by mass to 20.0% by mass and more preferably 1.0% by mass to 5.0% by mass relative to the total amount of the recording ink. When the loadings of polymer particle is less than 0.5% by mass, scratch resistance and waterproofness may not be satisfactory. When the loadings of polymer particle is more than 20% by mass, viscosity increase or polymer element fixation by drying may occur resulting in unstable ink discharge and nozzle clogging.

-Other Elements-

Other elements are not particularly limited and may be selected accordingly. Examples include defoamer, pH adjusting agent, antiseptic and antifungal agent, rust-preventive agent, antioxidant, UV ray absorber, chelating agent, oxygen absorbent, light stabilizing agent, and the like.

The defoamer is not particularly limited and may be selected accordingly. Suitable examples include silicone defoamer, polyether defoamer, fatty ester defoamer, and the like. These may be used alone or in combination. Of these, silicone defoamer is preferable for its excellent foam breaking effect.

Examples of silicone defoamer include silicone defoamer of oil type, compound type, self-emulsification type, emulsion type, and modified silicone defoamer, and the like. Examples of modified silicone defoamer include amino-modified silicone defoamer, carbinol-modified silicone defoamer, methacryl-modified silicone defoamer, polyether-modified silicone defoamer, alkyl-modified silicone defoamer, higher fatty ester-modified silicone defoamer, alkylene oxide-modified silicone defoamer, and the like. Of these, silicone defoamer of self-emulsification type and emulsion type are preferable in terms of usage in the recording ink which is an aqueous medium.

Commercially available products can be used as defoamers and examples include silicone defoamers by Shin-Etsu Chemical Co., Ltd. such as KS508, KS531, KM72, KM85, and the like, silicone defoamers by Dow Corning Toray Co., Ltd. such as Q2-3183A, SH5510, and the like, silicone defoamers by Nippon Unicar Co., Ltd. such as SAG30, and the like and defoamers of Asahi Denka Co., Ltd. such as Adeka Nate series, and the like.

The loadings of defoamer in the recording ink is not limited and may be selected accordingly. For example, it is preferably 0.001% by mass to 3% by mass and more preferably 0.005% by mass to 0.5% by mass.

When the defoamer is contained in the recording ink, it exhibits appropriate storage or discharge stability. If the loadings is less than 0.001% by mass, inclusion effect may not be satisfactory. If it is more than 3% by mass, it is likely to be a cause of clogging and reliability of the recording ink may be deteriorated.

Examples of antiseptic and antifungal agent include sodium dehydroacetate, sodium sorbate, 2-pyridinethiol-1-sodium oxide, sodium benzoate, sodium pentachlorophenol, and the like.

The pH adjusting agent can stabilize dispersion condition and discharge by retaining alkalinity of the ink. If pH is more than 11, melting amount of inkjet head or ink supply unit is too much leading to alteration, leakage or discharge failure of the ink. It is preferable to add pH adjusting agent when pigment is kneaded and dispersed in water with dispersant instead of adding it with humectant and wetting agent after knead dispersion. It is because dispersion may be destructed by adding depending on the pH adjusting agent.

Examples of pH adjusting agent include alcohol amines such as diethanolamine, triethanolamine, 2-amino-2-ethyl-1,3 propandiol, and the like, hydroxides of alkali metal element such as lithium hydroxide, sodium hydroxide, potassium hydroxide, and the like, hydroxides of ammonium such as ammonium hydroxide, quaternary ammonium hydroxide, quaternary phosphonium hydroxide, carbonates of alkali metal such as lithium carbonate, sodium carbonate, potassium carbonate, and the like.

Examples of rust-preventive agent include acid sulfite, sodium thiosulfate, ammonium thiodiglycolate, diisopropyl ammonium nitrite, pentaerythritol tetranitrate, dicyclohexylammonium nitrite, and the like.

Examples of antioxidant include phenolic antioxidant including hindered phenol antioxidant, amine antioxidant, sulfur antioxidant, phosphorous antioxidant, and the like.

Examples of phenolic antioxidant including hindered phenol antioxidant include butylated hydroxyanisole, 2,6-di-tert-butyl-4-ethylphenol, stearyl-β-(3,5-di-tert-butyl-4-hydroxyphenol)propionate, 2,2'-methylenebis(4-methyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propionyloxy]ethyl]2,4,8,10-tetra oxaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tetrakis[methylene-3-(3',5'-di-tert-butyl-4'-hydroxyphenyl)propionate]methane, and the like.

Examples of amine antioxidant include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisol, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3(3,5-di-tert-butyl-4-dihydroxyphenyl)propionate]methane, 1,1,3-tris(2-methyl-4-hydroxy-5-tert-butylphenyl)butane, and the like Examples of sulfur antioxidant include dilauryl-3,3'-thiodipropionate, distearylthiodipropionate, laurylstearylthiodipropionate, dimyristyl-3,3'-thiodipropionate, distearylβ,β'-thiodipropionate, 2-mercaptobenzoimidazole, dilaurylsulfide, and the like.

Examples of phosphorous antioxidant include triphenylphosphite, octadecylphosphite, triisodecylphosphite, trilauryltrithiophosphite, trinonylphenylphosphite, and the like.

Examples of UV ray absorber include UV ray absorber based on benzophenone, benzotriazole, salicylate, cyanoacrylate, nickel complex salt, and the like.

Examples of benzophenone-based UV-ray absorber include 2-hydroxy-4-n-octoxybenzophenone, 2-hydroxy-4-n-dodecyloxybenzophenone, 2,4-dihydroxybenzophenone, 2-hydroxy-4-methoxybenzophenone, 2,2',4,4'-tetrahydroxybenzophenone, and the like.

Examples of benzotriazole-based UV ray absorber include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, 2-(2'-hydroxy-3'-tert-butyl-5'-methylphenyl)-5-chlorobenzotriazole, and the like.

Examples of salicylate-based UV ray absorber include phenylsalicylate, p-tert-butylphenylsalicylate, p-octylphenylsalicylate, and the like.

Examples of cyanoacrylate-based UV ray absorber include ethyl-2-cyano-3,3'-diphenylacrylate, methyl-2-cyano-3-methyl-3-(p-methoxyphenyl)acrylate, butyl-2-cyano-3-methyl-3-(p-methoxyphenyl)acrylate, and the like.

Examples of nickel complex salt-based UV ray absorber include nickel-bis(octylphenyl)sulfide, 2,2'-thiobis(4-tert-octylferrate)-n-b utylamine nickel(II), 2,2'-thiobis(4-tert-octylferrate)-2-ethylhexylamine nickel(II), 2,2'-thiobis(4-tert-octylferrate)triethanolamine nickel(II), and the like.

Examples of chelating agent include sodium ethylenediamine tetraacetate, sodium nitrilotriacetate, sodium hydroxyethyl ethylenediaminetriacetate, sodium diethylenetriaminepentaacetate, sodium uramil diacetate, and the like.

The recording ink of the present invention is produced by dispersing or dissolving at least one of diketopyrrolopyrrole red pigment and phthalocyanine green pigment, dispersant, water-soluble solvent, one of polyol compound having carbon number 8 to 11 and glycolether compound, water and other elements as necessary in an aqueous medium and further stirring-mixing as necessary. The dispersion may be performed by sand mill, homogenizer, ball mill, paint shaker, ultrasound dispersion apparatus, and the like and stirring-mixing may be performed by a stirrer using normal agitating blade, magnetic stirrer, high-speed dispersion apparatus, and the like.

The coloring of the recording ink of the present invention is not particularly limited and may be selected accordingly and examples include yellow, magenta, cyan, black, and the like. It is possible to form a multicolor image when recording is performed using an ink set which uses two or more of these colors simultaneously and it is also possible to form a full color image when recording is performed by using an ink set which uses all colors simultaneously.

The properties of recording ink of the present invention are not particularly limited and surface tension, viscosity, electric conductivity and pH are preferably in the following ranges.

The surface tension is preferably 35 mN/m or less at 20° C.

The viscosity is preferably 2 mPa·s to 20 mPa·s and more preferably 3 mPa·s to 10 mPa·s at 25° C. If the viscosity is less than 2 mPa·s, image may be blurred, and when it is more than 20 mPa·s, maintaining discharge stability may be difficult.

The electric conductivity is preferably 0.5 S/m or less and more preferably 0.005 S/m to 0.4 S/m.

The pH is preferably 7 to 11.

(Ink Set)

The ink set of the present invention at least contains the recording ink of the present invention and it is combined with at least one of yellow ink, magenta ink, cyan ink and black ink.

Each yellow ink, magenta ink, cyan ink and black ink is not particularly limited and may be selected from known inks accordingly.

It is preferable for the ink set to use the red ink of 90% or more duty and magenta ink of less than 10% duty simultaneously for printing red color of 90% or more ink duty, and to use the red ink of 90% or more duty and yellow ink of less than 10% duty simultaneously for printing red color of less than 90% ink duty.

The ink duty is a ratio of color material assigned in the unit recording region and it is 100% maximum for primary color and 200% maximum for secondary color. The detail of ink duty will be explained later.

The recording ink of the present invention can be suitably used for printers having inkjet head such as piezo inkjet head which discharges ink by altering the inner volume of ink flow path by deforming the diaphragm forming wall face of the ink flow path using a piezoelectric device as a pressure generating unit which pressurizes the ink in the ink flow path (JP-A No. 02-051734), thermal inkjet head which generates air bubbles by heating the ink in the ink flow path using a heat element (JP-A No. 61-059911), electrostatic inkjet head which discharges ink drops by altering the inner volume of ink flow path by positioning diaphragm forming wall face of the ink flow path and electrode to face each other and generating electrostatic power between diaphragm and electrode to deform the diaphragm (JP-A No. 06-071882).

The recording ink of the present invention can be suitably used in various areas and is suitable for image forming apparatus of inkjet printing such as printers, and the like. For example, it can be used for printers having a function to facilitate print fixation by heating the recording paper and the recording ink at 50° C. to 200° C. during printing or before and after printing. It is especially suitable for use for ink cartridge, ink record, inkjet recording apparatus and inkjet recording method of the present invention.

(Ink Cartridge)

The ink cartridge of the present invention contains the recording ink of the present invention in the container and other members as necessary.

The container is not particularly limited and its form, structure, size, material, and the like may be selected accordingly. Suitable examples include a container at least having an ink bag formed of aluminum laminated film, resin film, and the like.

Next, ink cartridge will be explained referring to FIGS. 1 and 2. FIG. 1 is an external perspective view showing an ink cartridge prior to loading in the inkjet recording apparatus and FIG. 2 is a cross-sectional view of the ink cartridge.

Figure 2:
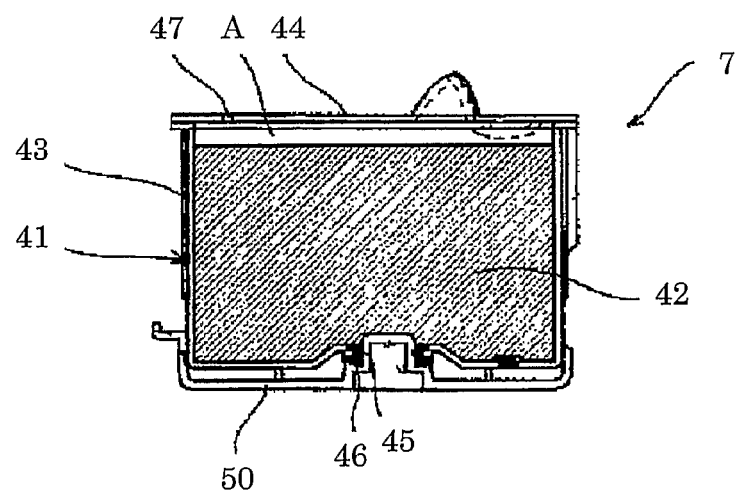
FIG. 2 is a cross-sectional view showing the ink cartridge of FIG. 1.

The ink cartridge 7 contains an ink absorber 42 which has absorbed an ink of predetermined color in the cartridge main body 41 as shown in FIG. 2. The cartridge main body 41 is formed by bonding or depositing the upper lid member 44 to the upper opening of case 43 having wide opening in upper part and may be made of resin molding, for example. Moreover, the ink absorber 42 is formed of porous body such as urethane foam, etc. and the ink is absorbed after it is compressed and inserted in the cartridge main body 41.

An ink feed opening 45 for feeding ink to the recording head 6 is formed on the bottom part of the case 43 of the cartridge main body 41 and a seal ring 46 is set in the inner periphery side of the ink feed opening 45. Furthermore, an air opening 47 is formed on the upper lid member 44. A cap member 50 is attached to the cartridge main body 41 to plug up the ink feed opening 45 and to prevent inner ink leakage caused by compressive deformation of the case 43 which is pressurized by wide side wall during handling for loading or transporting or vacuum packaging prior to loading.

The air opening 47 is sealed by affixing the seal member 55 in the form of film with an oxygen transmission rate of 100 ml/m$^2$ or more to the upper lid member 44 as shown in FIG. 1. By sealing the air opening 47 with the seal member 55 with an oxygen transmission rate of 100 ml/m$^2$ or more and by packing the ink cartridge 7 under depressurized condition using a packing member such as aluminum laminated film having no air permeability, ink deaeration is improved even when the air is dissolved in the ink during ink filling or because of the air in the space A (FIG. 2) formed between the ink absorber 42 and the cartridge main body 41. It is because the air inside the ink is evacuated to the space formed between packing materials outside of the cartridge main body 41 having high degree of vacuum through the seal member 55.

The ink cartridge of the present invention contains the recording ink (ink set) of the present invention and can be used by loading in various inkjet recording apparatuses as detachable. It is particularly preferable to be used as loaded in the inkjet recording apparatus of the present invention described later as detachable.

(Inkjet Recording Apparatus and Inkjet Recording Method)

The inkjet recording apparatus of the present invention contains at least an ink drop discharge unit and other units such as stimulation generation unit, control unit, and the like as necessary.

The inkjet recording method of the present invention contains at least ink drop discharge and other steps such as stimulation generation, control, and the like as necessary.

The inkjet recording method of the present invention may be preferably performed by the inkjet recording apparatus of the present invention and the ink drop discharge may be preferably performed by the ink drop discharge unit. Other steps may be preferably performed by other units respectively.

-Ink Drop Discharge and Ink Drop Discharge Unit-

The ink drop discharge is a step in which the recording ink is discharged by stimulation applied to the recording ink to form an image. The ink drop discharge unit is configured to discharge the recording ink by applying stimulation to the recording ink to form an image. The ink drop discharge unit is not particularly limited and may be selected accordingly and examples include various nozzles for ink discharge.

The stimulation may be generated through above-noted stimulation generation unit, for example. The stimulation is not particularly limited and may be selected accordingly. Examples include heat (temperature), pressure, vibration, light, and the like. These may be used alone or in combination. Among them, heat and pressure are suitable.

Specifically, examples of the stimulation generation unit include heating device, pressure device, piezoelectric element, vibration generating device, ultrasonic generating device, light, and the like, and in particular, piezoelectric actuator such as piezoelectric element, thermal actuator based on the phase-change of the film between liquid and vapor using electrothermal transducer such as heating resistor, and the like, shape memory alloy actuator based on phase-change of the metal by temperature change, electrostatic actuator based on electrostatic power, and the like.

The aspect of recording ink discharge is not particularly limited and it varies depending on the stimulation. If the stimulation is generated by "heat", such process is exemplified as thermal energy corresponding to the recording signal is applied to the recording ink in the recording head using a thermal head, for example, then bubbles are generated in the recording ink through the thermal energy, thereby injecting the recording ink from the nozzle of the recording head in form of ink drops owing to bubble pressure. Alternatively, if the stimulation is generated by "pressure", such process is exemplified as a voltage is applied to a piezoelectric element adhered to the place so-called pressure room in the ink flowing passage of the recording head, causing the piezoelectric element to be deflected, thereby reducing the volume of the pressure room and injecting the recording ink from the nozzle of the recording head in form of ink drops.

The ink drops of the recording ink discharged is preferably 3 pl to 40 pl in size at an injection speed of 5 m/s to 20 m/s, drive frequency of 1 kHz or more and resolution of 300 dpi or more.

In addition, the control unit is not particularly limited as long as it can control the individual unit efficiently and may be selected accordingly. Examples thereof include sequencer, computer, and the like.

Next, it is possible to decide the scanning direction during recording corresponding to the duty of image data in the present invention.

The ink drops of these four colors are applied to a recording medium with an appropriate balance and other colors are created by mixing during operation of full-color recording in an inkjet recording apparatus forming an image using the ink of four colors. When an image of green (G) is recorded, cyan (C) and yellow (Y) are mixed for recording. In other words, C and Y dots are put onto the same recording spot.

Figure 5A:
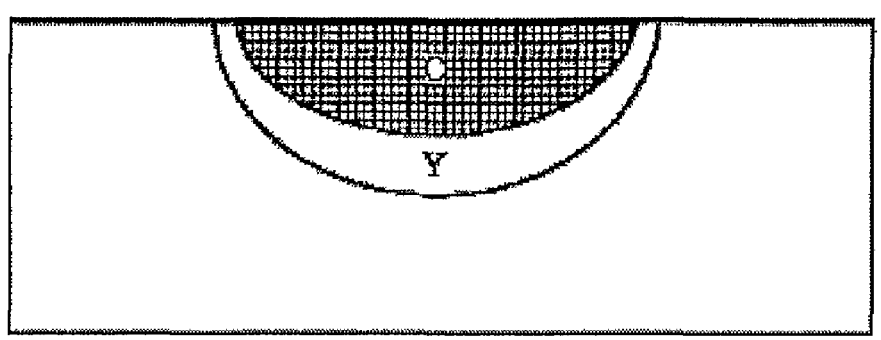
FIG. 5A is a cross-sectional view of a regular paper during recording in the outward direction (from C to Y) which shows a condition of applied ink droplet when the ink droplet is discharged to the regular paper using a recording head.
Figure 5B:
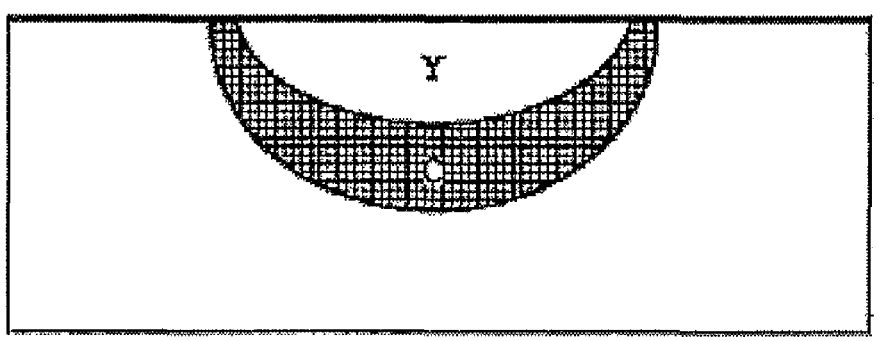
FIG. 5B is a cross-sectional view of a regular paper during recording in the homeward direction (from Y to C) which shows a condition of applied ink droplet when the ink droplet is discharged to the regular paper using the recording head.

The condition of applied ink drop when an ink drop is discharged onto the regular paper using a recording head is shown in FIGS. 5A and 5B. FIG. 5A is a cross-sectional view of the regular paper when recording in the outward direction (C→Y) and FIG. 5B is a cross-sectional view when recording in the homeward direction (Y→C). In FIG. 5A, the first recorded C covers the surface and next recorded Y penetrates deeper than C.

Figure 6:
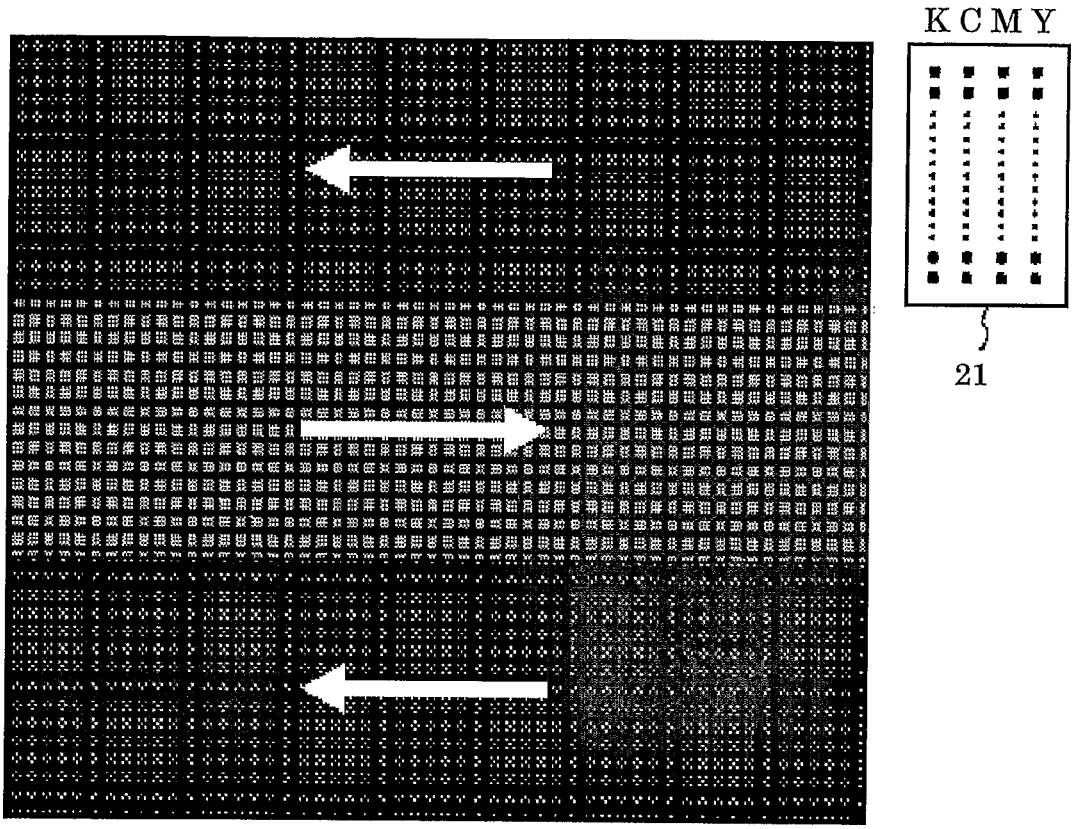
FIG. 6 is a view showing an exemplary ink record during recording in the homeward direction of FIG. 5B.

On the other hand, the first recorded Y covers the surface and the next recorded C penetrates deeper than Y. When these records are observed from the surface, 5A looks more cyanish green and 5B looks more yellowish green. The same CY-mixed color can be completely different color for reciprocating recording and nonuniformity color occurs alternatively at every linefeed as shown in FIG. 6.

In general, the level at which a person can recognize the color difference of an adjacent image expressed by following Equation 1 is said to be approximately 1.0.

$$\Delta E^* = \sqrt{\Delta L^* \times \Delta L^* + \Delta a^* \times \Delta a^* + \Delta b^* \times \Delta \Delta b^*}$$  Equation 1

Figure 7:
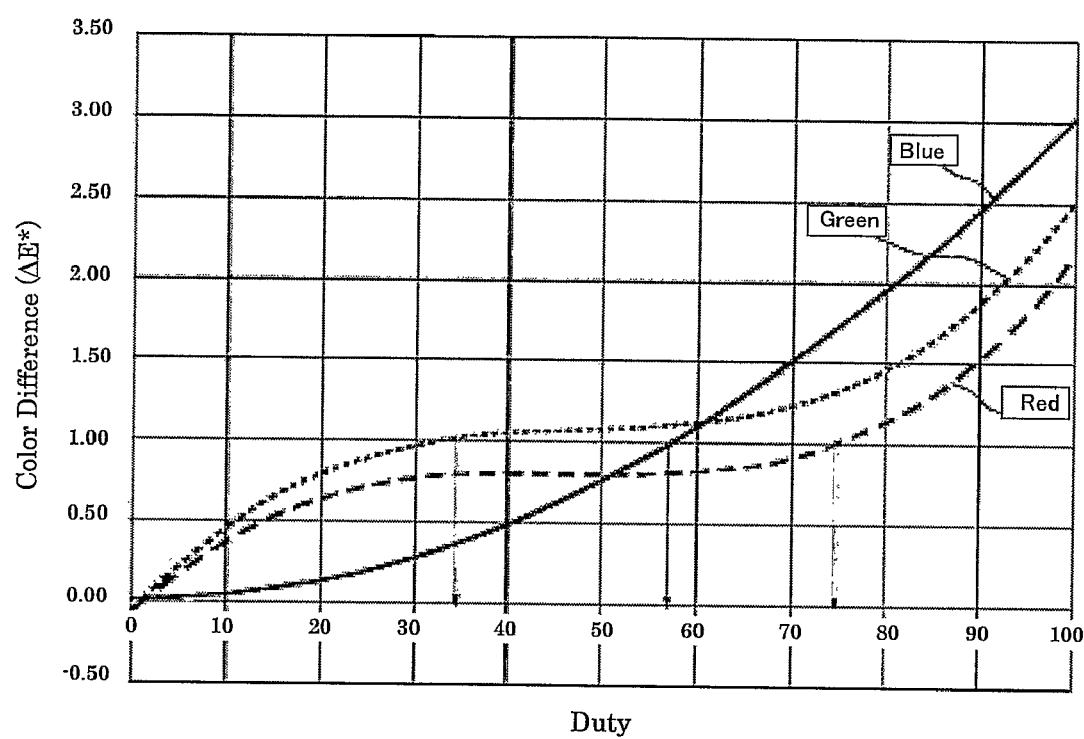
FIG. 7 is a graph showing a relation between ink duty and color difference ($\Delta E^*$).

From FIG. 7, it turns out that the color difference increases as the ink duty rate increases for all R, B and G and when the color difference $\Delta E^*$ is 1.0 or more, R, B and G are in high density region with R being approximately 75%, G being approximately 35% and B being approximately 57%.

It is possible to eliminate bidirectional color difference without slowing the printing speed as much as possible by performing one directional printing in the recording region of high ink duty with distinguishable color difference and performing bidirectional printing in the recording region of low ink duty with undistinguishable color difference. For example, it is possible to effectively pursue a high-speed printing and elimination of bidirectional color difference simultaneously if one directional printing is performed at 75% or more duty and bidirectional printing is performed at 75% or less duty. This threshold value differs depending on the ink composition and color material and it is preferable to be set for each model.

Practically, it is decided that if the bidirectional color difference is distinguishable or not by the color difference near boundary of scanning instead of average color difference in total. It is because of the vision property of human which is sensitive to the color difference of adjacent region but is insensitive to the color difference of a portion at some distance. It is therefore preferable to detect the boundary region of scanning and other region separately and decide on bidirectional or one directional recording.

Figure 8A:
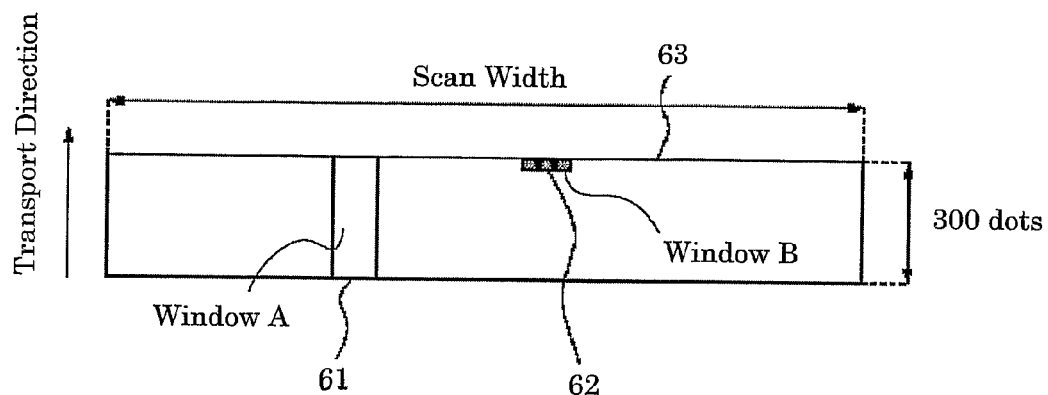
FIG. 8A is a view describing a calculation method of ink duty in a predetermined region of image data in the image region of a recording head.

FIG. 8A shows a calculation method of the ink duty in predetermined region of the image data in the image region (scanning region: also called "1 band") of scan width of recording head×300 dots (recording width of recording head) prior to recording when two windows as multiple windows are used. A window B62 is prepared to calculate the duty near boundary of image region (boundary with different band) and the ink duty in the window is calculated from the image data in the window by scanning the window through the image region.

A window A61 is for calculation of the ink duty of entire recording width of recording head at 600 dots per inch=600 dpi of resolution in lateral direction (duty of entire width in the transporting direction of a recording medium in the image region) and the size of the window in here is supposed to be 300 dots×128 dots.

A window B is for calculation of the ink duty of region near boundary of image region (boundary with adjacent band) in which recording is performed by each scan and the size of the window in here is supposed to be 32 dots×128 dots.

The window B62 should be set at a position from which the ink duty near boundary between bands can be read out. It is preferably the region from which the ink duty in the range from the boundary 63 to the site 0.5 mm to 5 mm away from the boundary 63 is read out. It is also desirable to set a window at a position which includes the ink duty of the dot closest to the boundary 63; however, the site can be a several dots away from the boundary 63.

It is desirable for the window A61 to have a width from which duty of entire width (band width) in the direction crossing the scanning direction of the head is readable; however, it can be set at a position a several dots away from the boundary 63 because only the ink duty of band width is wanted to be reflected.

Moreover, lengths of the windows A and B in the scanning direction of the head (length direction of the band) are not limited to 128 dots and may be the lengths with which the ink duty of the window is easily calculated.

The number of image data with which calculation is performed differs between windows A and B. In window A, calculation is performed with relatively large number of image data to obtain average density distribution of the scanning region compared to the window B where calculation is performed with relatively small number of image data to obtain local density distribution of the boundary.

However, this relation in number of image data is not mandatory because the same effect can be obtained by assigning a window to a site where boundary and band width are reflected as described above.

The calculation of the ink duty in these windows is performed by using the image data memorized in the buffer of recording control section.

Figure 8B:
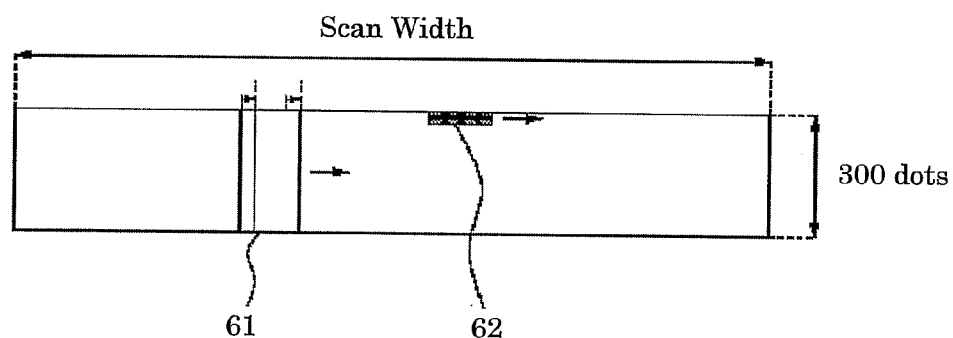
FIG. 8B is a view describing a scanning method to calculate ink duty by displacing each window one line at a time in the scanning direction of the recording head.
Figure 8C:
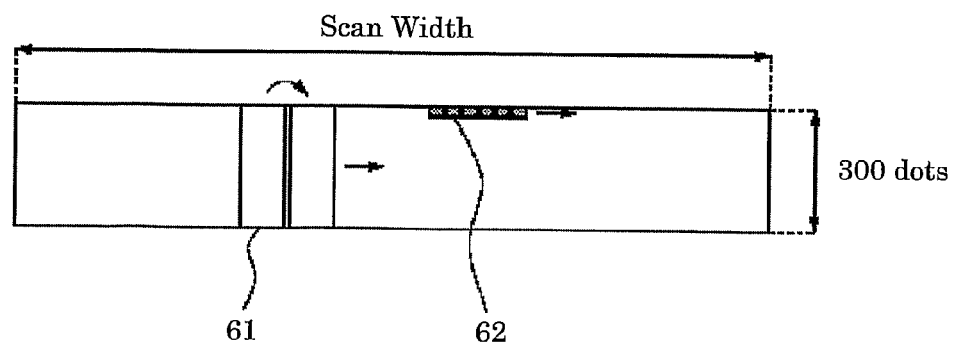
FIG. 8C is a view describing a scanning method to calculate ink duty by displacing each window per its length in the length direction of a band.

The scanning method of a window can be either a scanning method in which an ink duty is calculated by altering each window one line at a time in the scanning direction of the recording head (length direction of band) as shown in FIG. 8B or a scanning method in which an ink duty is calculated by altering each window by length of each window at a time (128 dots in lateral direction in this case) in the length direction of the band as shown in FIG. 8C.

Each ink duty Dc of cyan image, ink duty Dm of magenta image, ink duty Dy of yellow image in the window is counted and the total of Dc, Dm and Dy would be an ink duty in the window at a window position.

The threshold value of the ink duty of each window is set at 100% for window A and 75% for window B. 100% ink duty is defined as a condition in which the number of color ink dot recorded in a pixel position of 1/600 inch×1/600 inch is one. For example, an image of cyan 100% means that the region is full of cyan dots and 200% means a solid image of blue which is full of cyan and magenta dots.

More specifically, an ink duty is a ratio of applied color material in a single recording region and it is 100% maximum for the primary color and 200% maximum for the secondary color.

When the condition in which the ink duty of window A in the entire position of the recording region prior to recording is 100% or less and the ink duty of window B in all positions is 75% or less is satisfied, the recording speed is increased by performing in both direction of outward and homeward scan (reciprocation recording). When one of the condition is not satisfied, uneven printing is decreased by performing recording with one of outward or homeward scan (one directional recording).

Meanwhile, the threshold value of the ink duty of window A is set smaller than the threshold value of the window B because the ink duty of the window B is near boundary and is likely to be distinguishable with relatively less unevenness. Contrary, if the threshold value of the window A is set strictly small, the ratio of one directional recording becomes too much causing recording speed deterioration.

Figure 9:
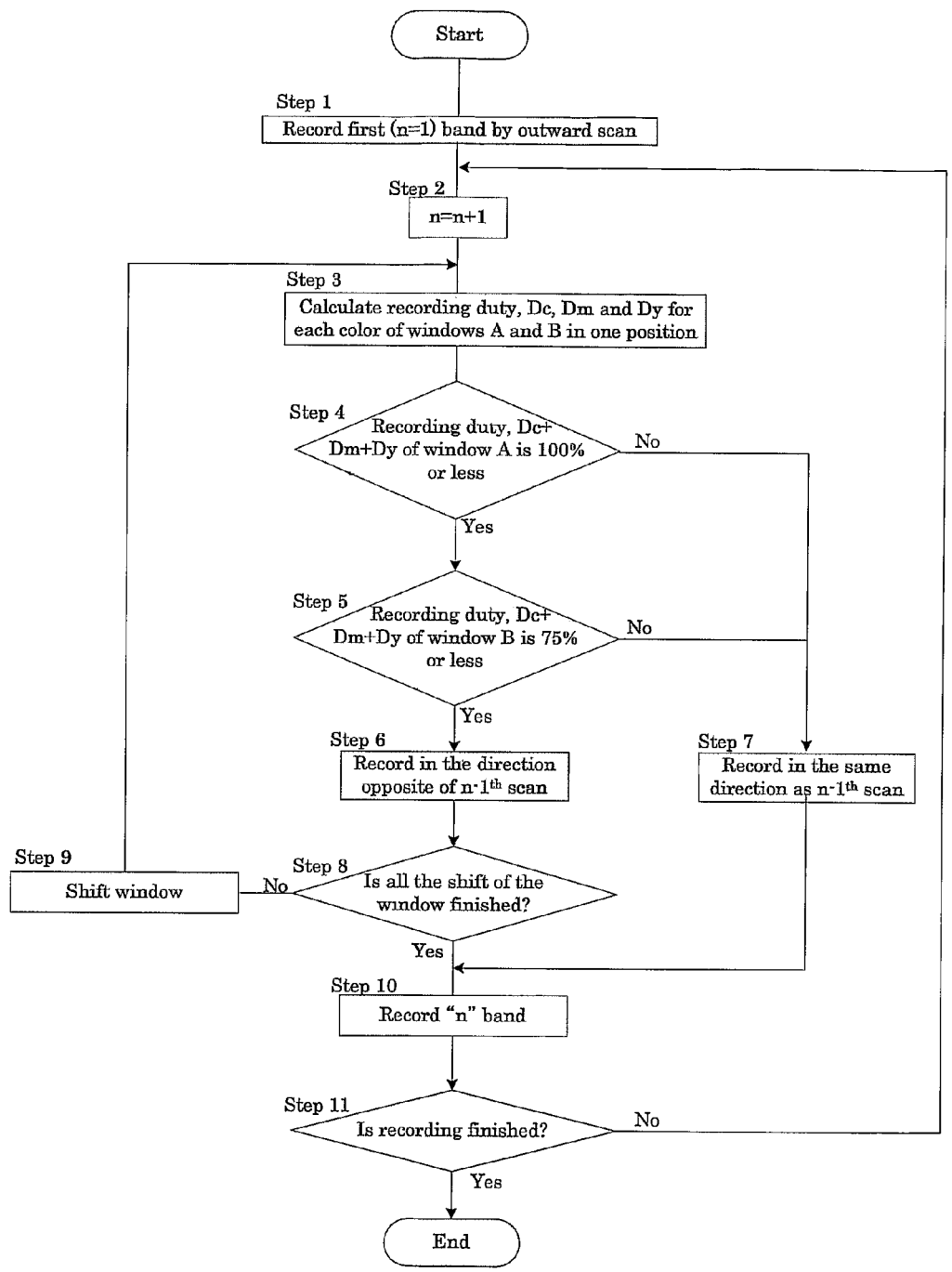
FIG. 9 is a flow chart describing the performance when ink duty of a predetermined region of image data in the image region is being calculated.

FIG. 9 is a flow chart showing above operation and the recording of the first scan (n=1) of the recording head is performed corresponding to the image data in step 1. In the example, the scanning direction starts from the home position of the recording head, however, it is not limited to the example.

Next, it is set to n=n+1 for transition to the next scan (recording of the second band) in step 2.

The ink duty of windows A and B at a position of next scan (the second scan, for example) is calculated from the ink duty of each color in step 3 and it is determined if the ink duty of the window A is 100% or less in step 4. If it is 100% or less, it is proceeded to step 5 and if it is more than 100%, it is proceeded to step 7. When it is 100% or less, it is then determined if the ink duty of window B is 75% or less in step 5. If it is 75% or less, it is proceeded to step 6 and if it is more than 75%, it is proceeded to step 7. The reciprocation recording operation, that is the recording in opposite of previous recording direction (the first scan in this case) is set to perform in step 6. The one directional printing operation, that is the recording in the same direction of previous recording, is set to perform in step 7.

After step 6, it is determined if all the shift in "n" band of each window is finished in step 8 and the window is shifted to the next position if it is not finished in step 9. It is then returned to step 3 after shifting and readout calculation is performed to see if there is a portion in which the ink duty exceeds the standard value until all the shift is finished.

When there is no window exceeding standard value after all the shift of window is finished, a recording in opposite direction with the (n−1)$^{th}$ band is performed (step 10).

When a recording in the same direction of previous band is set to perform in step 7, a recording is performed without calculating the ink duty of next window in the example.

These operations are repeated until all the recording is finished.

Next, an image forming method on a recording medium by containing the recording ink of the present invention in a ink cartridge, loading the ink cartridge in an inkjet printer and discharging the recording ink from a fine discharge opening as a liquid drop will be explained referring to drawings.

Figure 3:
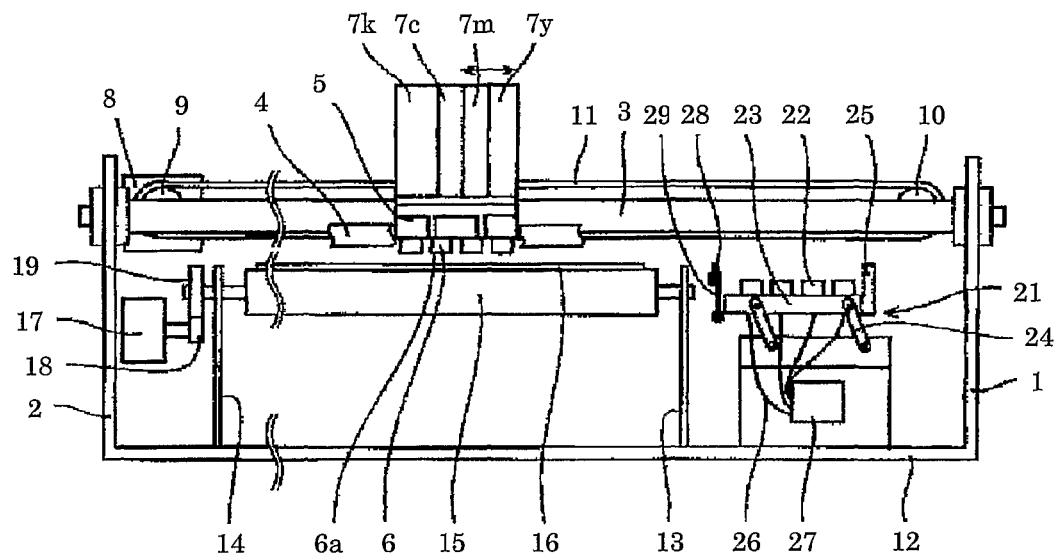
FIG. 3 is an outlined cross-sectional view showing an exemplary serial-type inkjet recording apparatus having an ink cartridge containing the ink of the present invention.

FIG. 3 is an outlined front view of an exemplary serial-type inkjet recording apparatus having an ink cartridge equipped with a recording ink compartment containing the recording ink of the present invention.

In the mechanical section of the inkjet recording apparatus, the main guide rod 3 and the sub guide rod 4 are bridged laterally between the side panels 1 and 2 in almost horizontal position and the carriage unit 5 is supported by the main guide rod 3 and the sub guide rod 4 in the main scanning direction as slidable.

Each of four head 6 which discharges yellow (Y) ink, magenta (M) ink, cyan (C) ink and black (Bk) ink respectively, is mounted on the carriage unit 5 with each discharge side (nozzle side) 6a facing downward. Four ink cartridges 7y, 7m, 7c and 7k as ink feeders for each color are mounted on the upper side of the head 6 of the carriage unit 5 as exchangeable.

The carriage unit 5 is then attached to the timing belt 11 which is extended between the drive pulley (drive timing pulley) 9 rotated by the main scanning motor 8 and the sub-drive pulley (idle pulley) 10 to control the drive of the main scanning motor 8 and the carriage 5, that is, four head 6 is moved into the main scanning direction.

Furthermore, by setting up the sub-frames 13 and 14 on the floor plate 12 which hooks up the side plates 1 and 2, the transport roller 15, by which the paper 16 is transported in the sub-scanning direction crossing the main scanning direction at a right angle, is placed rotatable between the sub-frames 13 and 14. And the sub-scanning motor 17 is placed on the side of the sub-frame 14 and the gear 18 is fixed on the rotation axis of the sub-scanning motor 17 and the gear 19 is fixed onto the axis of the transport roller 15 in order to transmit the rotation of the sub-scanning motor 17 to the transport roller 15.

The restorative system for liability 21 of the head 6 (hereafter referred to as "sub-system") is placed between the side plate 1 and the sub-frame 12. In the sub-system 21, the holder 23, which keeps the four cap units 22 for capping the discharge side of each head 6, is kept by the link member 24 as swingable 5 and the carriage unit 5 touches the catching part 25 mounted on the holder 23 by the movement in the main scanning direction. The holder 23 is lifted up following with the movement of the carriage unit 5 and the discharge side 6a of inkjet head 6 is capped with the cap unit 22 and the carriage unit 5 is moved further into the printing area. The holder 23 is then lifted down with the movement of the carriage unit 5 and the cap unit 22 is separated from the discharge side 6a of the inkjet head 6.

The cap unit 22 is connected with the suction pump 27 via the suction tube 26 while simultaneously being communicated with air via air open tube and air open bulb by forming an air opening. The suction pump 27 discharges suctioned waste solution into the waste solution storage tank which is not shown in figures via drain tubes, etc.

The wiper blade 28, as a wiping unit which may be of fabric, foaming or elastic members such as rubber, and the like with which the discharge side 6a of the inkjet head 6 is wiped, is mounted to the blade arm 29 on the side of the holder 23. The blade arm 29 is set up as swingable and it is swinged by the rotation of the cam that is rotated by the drive unit which is not shown in figures.

Figure 4:
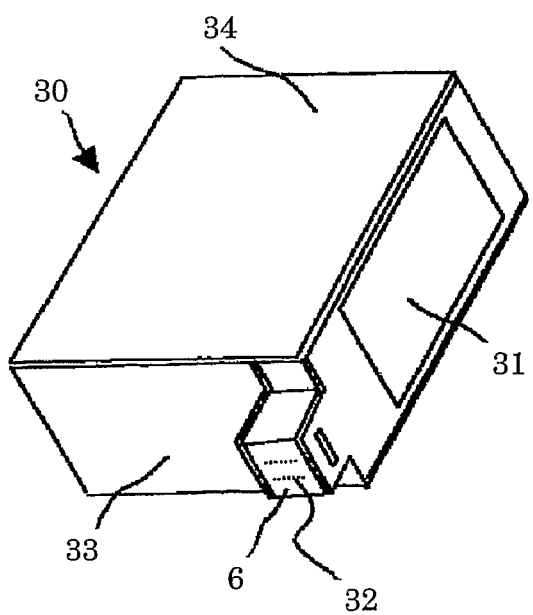
FIG. 4 is an external perspective view showing an exemplary recording unit unified with a recording head.

FIG. 4 shows a configuration example of the ink containing part wherein the ink of the present invention is contained and the recording cartridge (recording unit) equipped with a head part for discharging ink drops. The recording unit will be explained below.

The recording unit 30 is a serial type, and the main part is lined up with the head 6, ink tank 33 containing the ink fed from the head 6 and the cap member 34 which seals the inside of the ink tank 33. A lot of nozzle 32 for discharging ink is formed on the head 6 of the recording unit 30. The ink is fed from the ink tank 33 to the common liquid chamber (not shown in figures) via ink feeding tube (not shown) and discharged from the nozzle 32 corresponding to the electric signals entered by the electrode 31 from the recording apparatus body. This type of recording unit 30 is structurally favorable for affordable head powered by thermal energy which is referred to as thermal-type or bubble-type.

Because the ink of the present invention excels in wetting ability in the recording method such as bubble or thermal type, etc., the wetting ability to the thermal element is improved, discharge and frequency stability can be obtained and it is highly safe and extremely suitable.

Although examples are only applied to a serial type inkjet recording apparatus hereinbefore, the ink of the present invention is also applicable for other recording apparatuses equipped with line head, wherein the nozzles are aligned in a voluntary order such as zigzag, etc. and the density is concentrated to a degree as same as or of a fraction of the intended image resolution and aligned more wider than the recording medium.

Although the example described here was an example applied to a serial-type (shuttle-type) inkjet recording apparatus with scanning carriage, it can be also applied to a line-type inkjet recording apparatus equipped with line head.

The inkjet recording apparatus and the inkjet recording method of the present invention can be applied to various inkjet recordings and can be suitably used for inkjet recording printer, facsimile, copier, complex machine of printer/facsimile/copier, and the like.

(Ink Record)

The ink record of the present invention is an ink record recorded by the ink jet recording apparatus and the inkjet recording method of the present invention. The ink record of the present invention contains an image formed on a recording medium using the recording ink of the present invention.

The recording medium is not limited and may be selected accordingly and examples thereof include regular paper, gloss paper, special paper, cloth, film, overhead projection (OHP) sheet, and the like. These may be used alone or in combination.

The ink record may be suitably used for various purposes as a material on which various prints and/or images of high-quality and excellent stability over time with no blur is recorded.

Conventional problems can be solved by the present invention which enables to provide a recording ink and ink set in which diketopyrrolopyrrole red pigment and phthalocyanin green pigment with excellent color development can be stably dispersed in an aqueous medium; properties remain the same after long storage; and are suitable as red and green inks with appropriate discharge stability by inkjet; and ink cartridge, ink record, inkjet recording apparatus and inkjet recording method which utilize the recording ink respectively.

EXAMPLE

Herein below, with referring to Examples and Comparative Examples, the invention is explained in detail and the following Examples and Comparative Examples should not be construed as limiting the scope of this invention. All percentages and parts are by mass unless indicated otherwise.

Preparation Example 1

[Preparation of Yellow Ink]

| <Mill Base Formula> | |
|---|---|
| First yellow 031 (C.I. pigment yellow 74 loaded with 30% moisture by Dainichiseika Color & Chemicals Mfg. Co., Ltd.) | 18 parts |
| polyoxyethylene laurylether expressed by following Structural Formula as a nonionic surfactant | 5 parts |
| $C_{12}H_{25}$—O—$(CH_2CH_2O)_{43}$H | Structural Formula |
| deionized water | 77 parts |
| <Ink Formula> | |
| above-produced mill base | 100 parts |
| glycerin | 10 parts |
| 1,3-butanediol | 30 parts |
| 2,2,4-trimethyl-1,3-pentanediol | 4 parts |
| surfactant expressed by following Structural Formula | 4 parts |
| $C_{13}H_{27}$—O—$(CH_2CH_2O)_3CH_2$COONa | Structural Formula |
| Proxel LV (antiseptic/antifungal agent) | 0.2 parts |
| deionized water | 51.8 parts |

Next, polyoxyethylene laurylether was dissolved in deionized water and above pigment was mixed and moistened to a satisfactory extent. Zircornia beads of 0.5 mm diameter was filled into a kneading apparatus, DYNO-Mill KDL A by W. A. Bachofen of Switzerland, and knead-mixed at 2,000 rpm for 2 hours to obtain a mill base.

Next, glycerin, 1,3-butanediol, 2,2,4-trimethyl-1,3-pentanediol, surfactant expressed by above Structural Formula, and Proxel LV were dissolved in deionized water to produce a vehicle, and the vehicle was mixed with the mill base and then filtered by Tefron™-made filter of 1 µm average pore diameter to produce a yellow ink for inkjet recording with average particle diameter of 75 nm. The particle diameter was measured by a particle diameter measuring machine, UPA150 by Microtrac, Inc.

Preparation Example 2

[Preparation of Magenta Ink]

| <Mill Base Formula> | |
|---|---|
| HOSTAFINE MAGENTA E-PT (C.I. pigment red 122 by Clariant (Japan) K.K.) | 15 parts |
| polyoxyethylene laurylether expressed by following Structural Formula as a nonionic surfactant | 5 parts |
| $C_{12}H_{25}$—O—$(CH_2CH_2O)_{43}$H | Structural Formula |
| deionized water | 80 parts |

A mill base was prepared using above mill base formula and method similar to the one used for yellow ink of Preparation Example 1 to produce a magenta ink for inkjet recording with an average particle diameter of 120 nm using the ink formula similar to the one used for yellow ink of Preparation Example 1.

Preparation Example 3

[Preparation of Cyan Ink]

| <Mill Base Formula> | |
|---|---|
| IRGALITE Blue 8700 (C.I. pigment blue 15:3 by Ciba Specialty Chemicals K.K.) | 13 parts |
| polyoxyethylene laurylether expressed by following Structural Formula as a nonionic surfactant | 5 parts |
| $C_{12}H_{25}$—O—$(CH_2CH_2O)_{43}$H | Structural Formula |
| deionized water | 82 parts |

A mill base was prepared using above mill base formula and method similar to the one used for yellow ink of Preparation Example 1 to produce a cyan ink for inkjet recording with an average particle diameter of 105 nm using the ink formula similar to the one used for yellow ink of Preparation Example 1.

Example 1

-Preparation of Red Ink-

| <Mill Base Formula> | |
|---|---|
| IRGZIN DPP Red BTR (C. I. pigment red 254 by Ciba Specialty Chemicals K.K.) | 14 parts |
| polyoxyethylene laurylether expressed by following Structural Formula | 5 parts |
| $C_{12}H_{25}$—O—$(CH_2CH_2O)_{43}$H | Structural Formula |
| deionized water | 81 parts |
| <Ink Formula> | |
| above-produced mill base | 100 parts |
| glycerin | 10 parts |
| 1,3-butanediol | 30 parts |
| 2-ethyl-1,3-hexanediol | 4 parts |
| surfactant expressed by following Structural Formula | 4 parts |
| $C_{13}H_{27}$—O—$(CH_2CH_2O)_3CH_2$COONa | Structural Formula |
| Proxel LV (antiseptic/antifungal agent) | 0.2 parts |
| deionized water | 51.8 parts |

Next, polyoxyethylene laurylether was dissolved in deionized water and above pigment was mixed and moistened to a satisfactory extent. Zircornia beads of 0.5 mm diameter was filled into a kneading apparatus, DYNO-Mill KDL A by W. A. Bachofen of Switzerland, and knead-mixed at 2,000 rpm for 2 hours to obtain a mill base.

Next, glycerin, 1,3-butanediol, 2-ethyl-1,3-hexanediol, surfactant expressed by above Structural Formula, and Proxel LV were dissolved in deionized water to produce a vehicle, and the vehicle was mixed with the mill base and then filtered by Tefron™-made filter of 1 µm average pore diameter to produce a red ink with a volume average particle diameter of 156 nm.

The magenta ink of Preparation Example 2 and the yellow ink of Preparation Example 1 were filled in a cartridge and loaded in the prescribed place in the inkjet printer, IPSIO G707 by Ricoh Company, Ltd. Next, the red ink prepared in Example 1 was filled in a cartridge and loaded in the place for cyan ink. And the printing was performed using only all-dot (100%) red ink for red color.

Example 2

-Preparation of Red Ink-

| <Mill Base Formula> | |
|---|---|
| IRGZIN DPP Red BTR (C.I. pigment red 254 by Ciba Specialty Chemicals K.K.) | 14 parts |
| dispersant expressed by following Structural Formula as an anionic surfactant | 5 parts |

Structural Formula (A)

$$\text{C}_6\text{H}_5-\text{CH}=\text{CH}-\text{C}_6\text{H}_4-\text{O}-(\text{CH}_2\text{CH}_2\text{O})_{17}-\text{SO}_3\text{NH}_4$$

| deionized water | 81 parts |
|---|---|

Next, the dispersant expressed by above Structural Formula (A) which is an anionic surfactant was dissolved in deionized water to produce a mill base similarly to Example 1. And an red ink with a volume average particle diameter of 102 nm was produced using the ink formula similarly to Example 1.

The magenta ink of Preparation Example 2 and the yellow ink of Preparation Example 1 were filled in a cartridge and loaded in the prescribed place in the inkjet printer, IPSIO G707 by Ricoh Company, Ltd. Next, the red ink prepared in Example 2 was filled in a cartridge and loaded in the place for cyan ink. And the printing was performed using only all-dot (100%) red ink for red color.

Example 3

-Preparation of Ink Set-

The magenta ink of Preparation Example 2 and the yellow ink of Preparation Example 1 were filled in a cartridge and loaded in the prescribed place in the inkjet printer, IPSIO G707 by Ricoh Company, Ltd.

Next, the red ink prepared in Example 2 was filled in a cartridge and loaded in the place for cyan ink. And the printing of red ink was performed at each ink duty of 50%, 90% and 100%. The ink ratio of each ink duty was 95% red ink and 5% yellow ink for 50% duty, 100% red ink for 90% duty and 95% red ink and 5% magenta ink for 100% duty.

Example 4

-Preparation of Green Ink-

| <Mill Base Formula> | |
|---|---|
| IRGALITE Green 6G (C.I. pigment green 36 by Ciba Specialty Chemicals K.K.) | 15 parts |
| dispersant expressed by following Structural Formula (A) as an anionic surfactant | 6 parts |

Structural Formula (A)

$$\text{C}_6\text{H}_5-\text{CH}=\text{CH}-\text{C}_6\text{H}_4-\text{O}-(\text{CH}_2\text{CH}_2\text{O})_{17}-\text{SO}_3\text{NH}_4$$

| deionized water | 79 parts |
|---|---|
| <Ink Formula> | |
| above-produced mill base | 100 parts |
| glycerin | 15 parts |
| 1,3-butanediol | 30 parts |
| 2,2,4-trimethyl-1,3-pentanediol | 4 parts |
| surfactant expressed by following Structural Formula | 4 parts |

Structural Formula $C_{13}H_{27}-O-(CH_2CH_2O)_3CH_2COONa$

| Proxel LV (antiseptic/antifungal agent) | 0.2 parts |
|---|---|
| deionized water | 46.8 parts |

Next, a mill base was prepared using above mill base formula and method similarly to Example 1 and a green ink with a volume average particle diameter of 123 nm was produced using above ink formula and method similarly to Example 1.

The cyan ink of Preparation Example 3 and the yellow ink of Preparation Example 1 were filled in a cartridge and loaded in the prescribed place in the inkjet printer, IPSIO G707 by Ricoh Company, Ltd. Next, the green ink prepared in Example 4 was filled in a cartridge and loaded in the place for magenta ink. And the printing was performed using only all-dot (100%) green ink for green color.

Example 5

| <Mill Base Formula> | |
| --- | --- |
| IRGALITE Green GFNP | 14 parts |
| (C.I. pigment green 7 by Ciba Specialty Chemicals K.K.) | |
| dispersant expressed by following Structural Formula | 5 parts |
| $C_{12}H_{25}-O-(CH_2CH_2O)_{43}H$ | Structural Formula |
| deionized water | 81 parts |
| <Ink Formula> | |
| mill base | 100 parts |
| glycerin | 12 parts |
| propylene glycol | 36 parts |
| 2-ethyl-1,3-hexanediol | 4 parts |

| -continued | |
| --- | --- |
| surfactant expressed by following Structural Formula | 4 parts |
| $C_{13}H_{27}-O-(CH_2CH_2O)_3CH_2COONa$ | Structural Formula |
| Proxel LV (antiseptic/antifungal agent) | 0.2 parts |
| deionized water | 43.8 parts |

The dispersant expressed by above Structural Formula was dissolved in deionized water and above pigment was mixed and moistened to a satisfactory extent. Zircornia beads of 0.5 mm diameter was filled into a kneading apparatus, DYNO-Mill KDL A by W. A. Bachofen of Switzerland, and knead-mixed at 2,000 rpm for 2 hours to obtain a mill base.

Next, glycerin, propylene glycol, 2-ethyl-1,3-hexanediol, surfactant expressed by above Structural Formula, and Proxel LV were dissolved in deionized water to produce a vehicle, and the vehicle was mixed with the mill base and then filtered by Tefron™-made filter of 1 μm average pore diameter to produce a green ink for inkjet recording with an average particle diameter of 106 nm.

The magenta ink of Preparation Example 2 and the yellow ink of Preparation Example 1 were filled in a cartridge and loaded in the prescribed place in the inkjet printer, IPSIO G707 by Ricoh Company, Ltd. Next, prepared green ink was filled in a cartridge and loaded in the place for cyan ink. And the printing was performed using only all-dot (100%) green ink for green color.

Example 6

| <Mill Base Formula> | |
| --- | --- |
| IRGALITE Green 6G | 14 parts |
| (C.I. pigment green 36 by Ciba Specialty Chemicals K.K.) | |
| dispersant expressed by following Structural Formula | 5 parts |
| | Structural Formula |
| $C_{12}H_{25}-O-(CH_2CH_2O)_{11}SO_3NH_4$ | |
| deionized water | 81 parts |
| <Ink Formula> | |
| above-produced mill base | 100 parts |
| glycerin | 14 parts |
| 1,6-hexanediol | 32 parts |
| 2-ethyl-1,3-hexanediol | 4 parts |
| Pesresin A-520 | 2.8 parts |
| (water-dispersible polyester resin with mass-average molecular weight of 14,000 and solid content of 30% by Takamatsu Oil & Fat Co, Ltd.) | |
| FT-150 | 4 parts |
| (fluorochemical surfactant expressed by following Structural Formula (16) by Neos Co., Ltd.) | |

Structural Formula (16)

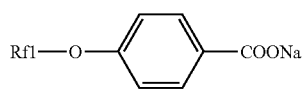

In above Structural Formula (16), Rf1 is one of the compounds expressed by following Structural Formulas (16a) and (16b).

| | Structural Formula |
|---|---|
| 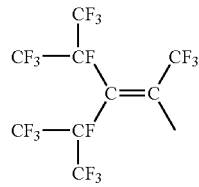 | |
| | Structural Formula |
| 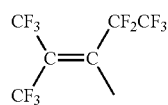 | |
| Proxel LV (antiseptic/antifungal agent) | 0.2 parts |
| deionized water | 43.0 parts |

The dispersant expressed by above Structural Formula was dissolved in deionized water to produce a mill base as similar to Example 5.

Next, glycerin, 1,6-hexanediol, 2-ethyl-1,3-hexanediol, Pesresin A-520, FT-150 and Proxel LV were dissolved in deionized water to produce a vehicle, and the vehicle was mixed with the mill base and then filtered by Tefron™-made filter of 1 μm average pore diameter to produce a green ink for inkjet recording with an average particle diameter of 99 nm.

The magenta ink of Preparation Example 2 and the yellow ink of Preparation Example 1 were filled in a cartridge and loaded in the prescribed place in the inkjet printer, IPSIO G707 by Ricoh Company, Ltd. Next, the green ink prepared in Example 6 was filled in a cartridge and loaded in the place for cyan ink. And the printing was performed using only all-dot (100%) green ink for green color.

Example 7

| <Mill Base Formula> | |
|---|---|
| IRGAZIN DPP Rubine TR | 15 parts |
| (C.I. pigment red 264 by Ciba Specialty Chemicals K.K.) | |
| dispersant expressed by following Structural Formula (17) | 5 parts |

Structural Formula (17)

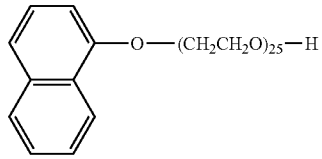

| deionized water | 80 parts |
|---|---|
| <Ink Formula> | |
| above-produced mill base | 100 parts |
| glycerin | 15 parts |
| 1,5-pentanediol | 30 parts |
| 2,2,4-trimethyl-1,3-pentanediol | 4 parts |
| FT-400SW | 5 parts |
| (fluorochemical surfactant with solid content of 50% expressed by following Structural Formula (18) by Neos Co., Ltd.) | |

Structural Formula (18)

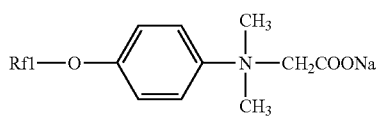

In above Structural Formula (18), Rf1 is one of the compounds expressed by above Structural Formulas (16a) and (16b).

| Proxel LV (antiseptic/antifungal agent) | 0.2 parts |
|---|---|
| deionized water | 45.8 parts |

The dispersant expressed by above Structural Formula was dissolved in deionized water to produce a mill base similarly to Example 5.

Next, glycerin, 1,5-pentanediol, 2,2,4-trimethyl-1,3-pentanediol, FT-400SW and Proxel LV were dissolved in deionized water to produce a vehicle, and the vehicle was mixed with the mill base and then filtered by Tefron™-made filter of 1 μm average pore diameter to produce a red ink for inkjet recording with an average particle diameter of 87 nm.

The cyan ink of Preparation Example 3 and the yellow ink of Preparation Example 1 were filled in a cartridge and loaded in the prescribed place in the inkjet printer, IPSIO G707 by Ricoh Company, Ltd. Next, the red ink prepared in Example 7 was filled in a cartridge and loaded in the place for magenta ink. And the printing was performed using only all-dot (100%) red ink for red color.

Example 8

| <Mill Base Formula> | |
|---|---:|
| IRGZAIN DPP Red BTR (C.I. pigment red 254 by Ciba Specialty Chemicals K.K. ) | 15 parts |
| dispersant expressed by following Structural Formula (13) | 6 parts |
| Structural Formula (13) | |
| $C_{12}H_{25}$—O—$(CH_2CH_2O)_{43}$H | |
| deionized water | 79 parts |
| <Ink Formula> | |
| above-produced mill base | 100 parts |
| glycerin | 12 parts |
| triethylene glycol | 32 parts |
| 2,2,4-trimethyl-1,3-pentanediol | 4 parts |
| PF-151N | 2 parts |
| (fluorochemical surfactant expressed by following Structural Formula (19) by Omnova Solutions, Inc.) | |

Structural Formula (19)

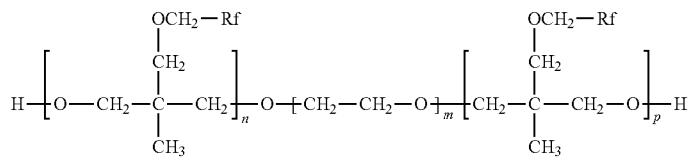

In above Structural Formula (19), Rf1 represents one of $CF_3$ and $CF_2CF_3$. "n" represents "8". "m" represents an integer of 20 or less. "p" represents an integer of 4 or less.

| WEM-321U | 7 parts |
|---|---:|
| (acryl-urethanecore shell type aqueous emulsion having self-crosslinking property after printing and drying with the minimum film-forming temperature of 10° C., average particle diameter of 100 nm, solid content of 38% and acryl/urethane ratio of 50/50 by Taisei Finechemical Co., Ltd.) | |
| Proxel LV (antiseptic/antifungal agent) | 0.2 parts |
| deionized water | 42.8 parts |

The dispersant expressed by above Structural Formula was dissolved in deionized water to produce a mill base as similar to Example 5.

Next, glycerin, triethylene glycol, 2,2,4-trimethyl-1,3-pentanediol, PF-151N, WEM-321U and Proxel LV were dissolved in deionized water to produce a vehicle, and the vehicle was mixed with the mill base and then filtered by Tefron™-made filter of 1 μm average pore diameter to produce a red ink for inkjet recording with an average particle diameter of 95 nm.

The cyan ink of Preparation Example 3 and the yellow ink of Preparation Example 1 were filled in a cartridge and loaded in the prescribed place in the inkjet printer, IPSIO G707 by Ricoh Company, Ltd. Next, the red ink prepared in Example 8 was filled in a cartridge and loaded in the place for magenta ink. And the printing was performed using only all-dot (100%) red ink for red color.

Example 9

<Mill Base Formula>

| | |
|---|---|
| IRGZAIN DPP Red BTR<br>(C.I. pigment red 254 by Ciba Specialty Chemicals K.K.) | 15 parts |
| dispersant expressed by following Structural Formula (20) | 6 parts |

Structural Formula (20)

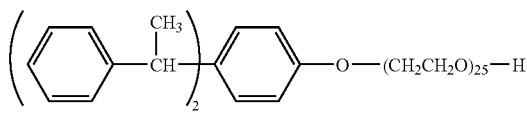

| | |
|---|---|
| deionized water | 79 parts |

<Ink Formula>

| | |
|---|---|
| above-produced mill base | 100 parts |
| glycerin | 12 parts |
| 3-methyl-1,3-butanediol | 32 parts |
| 2-ethyl-1,3-hexanediol | 4 parts |
| JC-05<br>(styrene-acryl copolymer with mass-average molecular weight of 20,000 and solid content of 21% by Seiko PMC Corp.) | 10 parts |
| FT-110<br>(a fluorochemical surfactant expressed by following Structural Formula (21) by Neos Co., Ltd.) | 4 parts |

Structural Formula (21)

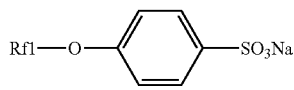

In above Structural Formula (21), Rf1 is one of the compounds expressed by above Structural Formulas (16a) and (16b).

| | |
|---|---|
| Proxel LV (antiseptic/antifungal agent) | 0.2 parts |
| deionized water | 37.8 parts |

The dispersant expressed by above Structural Formula (20) was dissolved in deionized water to produce a mill base as similar to Example 5.

Next, glycerin, 3-methyl-1,3-butanediol, 2-ethyl-1,3-hexanediol, JC-05, FT-110 and Proxel LV were dissolved in deionized water to produce a vehicle, and the vehicle was mixed with the mill base and then filtered by Tefron™-made filter of 1 μm average pore diameter to produce a red ink for inkjet recording with an average particle diameter of 95 nm.

The cyan ink of Preparation Example 3 and the yellow ink of Preparation Example 1 were filled in a cartridge and loaded in the prescribed place in the inkjet printer, IPSIO G707 by Ricoh Company, Ltd. Next, the red ink prepared in Example 9 was filled in a cartridge and loaded in the place for magenta ink. And the printing was performed using only all-dot (100%) red ink for red color.

Example 10

The magenta ink of Preparation Example 2 and the yellow ink of Preparation Example 1 were filled in a cartridge and loaded in the prescribed place in the inkjet printer, IPSIO G707 by Ricoh Company, Ltd. Next, the red ink prepared in Example 9 was filled in a cartridge and loaded in the place for cyan ink. And the printing of red ink was performed at each ink duty of 50%, 90% and 100%. The ink ratio of each ink duty was 95% red ink and 5% yellow ink for 50% duty, 100% red ink for 90% duty and 95% red ink and 5% magenta ink for 100% duty.

Example 11

A mill base was prepared similarly to Example 1 except for altering the dispersant of Example 1 to lauryl ether sulfate sodium salt expressed by following Structural Formula (22) to produce a recording ink.

$$C_{12}H_{25}-O-SO_3Na \qquad \text{Structural Formula (22)}$$

The magenta ink of Preparation Example 2 and the yellow ink of Preparation Example 1 were filled in a cartridge and loaded in the prescribed place in the inkjet printer, IPSIO G707 by Ricoh Company, Ltd. Next, the red ink prepared in Example 1 was filled in a cartridge and loaded in the place for cyan ink. And the printing was performed using only all-dot (100%) red ink for red color.

Example 12

A mill base was prepared similarly to Example 1 except for altering 2-ethyl-1,3-hexanediol of Example 1 to 3-methyl-2,4-heptanediol and a recording ink was produced using the mill base.

The magenta ink of Preparation Example 2 and the yellow ink of Preparation Example 1 were filled in a cartridge and loaded in the prescribed place in the inkjet printer, IPSIO G707 by Ricoh Company, Ltd. Next, the red ink prepared in Example 1 was filled in a cartridge and loaded in the place for cyan ink.

And the printing was performed using only all-dot (100%) red ink for red color.

Example 13

A mill base was prepared similarly to Example 1 except for altering glycerin and 1,3-butanediol of Example 1 to N-methyl-2-pyrrolidone to produce a recording ink.

The magenta ink of Preparation Example 2 and the yellow ink of Preparation Example 1 were filled in a cartridge and loaded in the prescribed place in the inkjet printer, IPSIO G707 by Ricoh Company, Ltd. Next, the red ink prepared in Example 1 was filled in a cartridge and loaded in the place for cyan ink. And the printing was performed using only all-dot (100%) red ink for red color.

Example 14

A mill base was prepared similarly to Example 6 except for altering Pesresin A-520 of Example 6 to Takelac W-5025 (a water-dispersible polyurethane resin with mass-average molecular weight of 18,000 and solid content of 30% by Mitsui Takeda Chemicals, Inc.) to produce a recording ink.

The magenta ink of Preparation Example 2 and the yellow ink of Preparation Example 1 were filled in a cartridge and loaded in the prescribed place in the inkjet printer, IPSIO G707 by Ricoh Company, Ltd. Next, the green ink prepared in Example 6 was filled in a cartridge and loaded in the place for cyan ink. And the printing was performed using only all-dot (100%) green ink for green color.

Comparative Example 1

The cyan ink of Preparation Example 3, the magenta ink of Preparation Example 2 and the yellow ink of Preparation Example 1 were filled in a cartridge and loaded in the prescribed place in the inkjet printer, IPSIO G707 by Ricoh Company, Ltd. to perform printing.

Comparative Example 2

The magenta ink of Preparation Example 2 and the yellow ink of Preparation Example 1 were filled in a cartridge and loaded in the prescribed place in the inkjet printer, IPSIO G707 by Ricoh Company, Ltd. And equal amount of each yellow ink of Preparation Example 1 and the magenta ink of Preparation Example 2 were mixed to produce a red ink. The prepared red ink was then filled in a cartridge and loaded in the place for cyan ink to perform printing.

Comparative Example 3

A red ink for inkjet recording with an average particle diameter of 106 nm was produced using mill base formula and ink formula as similar to Example 9 except for altering the pigment of Example 9 to CROMOPHTAL Red A2B (C. I. pigment red 177, dianthraquinonyl red pigment by Ciba Specialty Chemicals K.K.).

The magenta ink of Preparation Example 2 and the yellow ink of Preparation Example 1 were filled in a cartridge and loaded in the prescribed place in the inkjet printer, IPSIO G707 by Ricoh Company, Ltd. Next, the red ink prepared in Example 9 was filled in a cartridge and loaded in the place for cyan ink. And the printing was performed using only all-dot (100%) red ink for red color.

Comparative Example 4

A recording ink was produced using a mill base prepared similarly to Example 1 except for not using 2-ethyl-1,3-hexanediol.

The magenta ink of Preparation Example 2 and the yellow ink of Preparation Example 1 were filled in a cartridge and loaded in the prescribed place in the inkjet printer, IPSIO G707 by Ricoh Company, Ltd. Next, the red ink prepared in Example 1 was filled in a cartridge and loaded in the place for cyan ink. And printing was performed using only all-dot (100%) red ink for red color.

Comparative Example 5

Preparation of Ink Set

The magenta ink of Preparation Example 2 and the yellow ink of Preparation Example 1 were filled in a cartridge and loaded in the prescribed place in the inkjet printer, IPSIO G707 by Ricoh Company, Ltd.

Next, the red ink prepared in Comparative Example 3 was filled in a cartridge and loaded in the place for cyan ink. And the printing of red ink was performed at each ink duty of 50%, 90% and 100%. The ink ratio of each ink duty was 95% red ink and 5% yellow ink for 50% duty, 100% red ink for 90% duty and 95% red ink and 5% magenta ink for 100% duty.

<Storage Stability (Viscosity)>

The rate of viscosity change (%) of each recording ink produced in Examples 1 to 14 and Comparative Examples 1 to 5 when stored in a tightly sealed condition at 50° C. for one month is shown in Table 1. A viscometer, RC-500 by Toki Sangyo Co., Ltd. was used for measuring viscosity.

<Storage Stability (Particle Diameter)>

The rate of average particle diameter change (%) of each recording ink produced in Examples 1 to 14 and Comparative Examples 1 to 5 when stored in a tightly sealed condition at 50° C. for one month is shown in Table 1. A particle size analyzer, UPA150 by Microtrac, Inc. was used for measuring particle diameter.

<Discharge Stability>

Each recording ink produced in Examples 1 to 14 and Comparative Examples 1 to 5 was filled in the inkjet printer, IPSIO G707 by Ricoh Company, Ltd. and ability to recover no matter how long printing is halted without capping or cleaning during printing operation was investigated. And its reliability was determined on how long it takes until the ejection direction is misaligned or the mass of discharged drops is changed according to the following evaluation standard.

[Evaluation Standard]
  A: 600 seconds or more
  B: 60 seconds or more and less than 600 seconds
  C: less than 60 seconds <Measurement of Saturation and Hue Angle>

A solid printing was performed in one direction for each recording ink using following regular paper as paper for printing test by using the inkjet printer, IPSIO G707 by Ricoh Company, Ltd. Each value of luminance was measured using a reflective/color spectrophotometric densitometer by X-Rite, Inc. after printing and drying.

-Paper for Printing Test-
  Regular paper: my paper SA by NBS Ricoh Co., Ltd.
    XEROX4024 by Fuji Xerox Office Supply PB Paper by Canon Inc.

<Measurement of Bidirectional Color Difference>

A solid printing was performed in both directions for each recording ink using following regular paper as paper for printing test by using the inkjet printer, IPSIO G707 by Ricoh Company, Ltd. Each value of luminance was measured using a reflective/color spectrophotometric densitometer by X-Rite, Inc. after printing and drying. The maximum value of each measured color difference is shown in Table 1.

-Paper for Printing Test-
Regular paper: my paper SA by NBS Ricoh Co., Ltd. XEROX4024 by Fuji Xerox Office Supply PB Paper by Canon Inc.

TABLE 1

| | Rate of Viscosity Change | Rate of Particle Diameter Change | Discharge Stability | Hue Angle (Red) 50% duty | 90% duty | 100% duty | Saturation Red | Green | Bidirectional Color Difference (Maximum Value) |
|---|---|---|---|---|---|---|---|---|---|
| Example 1 | 13% | 16% | B | 19° | 24° | 30° | 68.9 | — | 2.5 |
| Example 2 | −1% | 9% | A | 19° | 24° | 31° | 70.3 | — | 2.1 |
| Example 3 | −1% | 9% | A | 24° | 24° | 25° | 69.8 | — | 1.9 |
| Example 4 | 3% | 7% | A | — | — | — | — | 60.1 | 2.0 |
| Example 5 | 10% | 8% | A | — | — | — | — | 58.0 | 2.6 |
| Example 6 | −1% | 1% | A | — | — | — | — | 60.8 | 2.5 |
| Example 7 | 6% | −1% | A | 18° | 23° | 30° | 60.1 | — | 2.4 |
| Example 8 | 5% | 3% | A | 20° | 24° | 32° | 69.7 | — | 2.2 |
| Example 9 | 2% | 0% | A | 20° | 24° | 31° | 70.4 | — | 1.9 |
| Example 10 | 2% | 0% | A | 24° | 25° | 25° | 70.3 | — | 2.0 |
| Example 11 | 21% | 16% | B | 20° | 24° | 33° | 66.1 | — | 2.8 |
| Example 12 | 15% | 9% | B | 21° | 24° | 33° | 67.9 | — | 2.3 |
| Example 13 | 5% | −2% | B | 20° | 24° | 32° | 66.4 | — | 2.5 |
| Example 14 | 8% | 4% | A | — | — | — | — | 60 | 2.3 |
| Com. Example 1 | not obtained | not obtained | not obtained | 24° | 25° | 25° | 54.3 | 53.8 | 10.1 |
| Com. Example 2 | −2% | 3% | A | 24° | 24° | 25° | 54.0 | 53.8 | 2.3 |
| Com. Example 3 | 4% | 1% | A | 18° | 22° | 26° | 50.3 | — | 2.5 |
| Com. Example 4 | 2% | 5% | A | 21° | 23° | 32° | 56.8 | — | |
| Com. Example 5 | 4% | 1% | A | 18° | 19° | 19° | 50 | — | 2.1 |

INDUSTRIAL APPLICABILITY

The recording ink of the present invention excels in discharge stability with no head clogging during printing and can obtain high quality images with good color tone on the regular paper as well as on an exclusive recording paper and is suitably used for inkjet recording method forming color images. Also, it can widely be used for regular stationeries such as aqueous pen, aqueous marker, aqueous ballpoint pen, and the like, recording meters and inks for pen plotter.

The invention claimed is:

1. A recording ink, comprising:
a pigment,
a dispersant,
a water-soluble solvent,
a wetting agent,
water, and
water-dissolved material or water-dispered material comprising at least one of an acrylic resin, methacrylic resin, polyurethane resin and a polyester resin, wherein the resin has a mass-average molecular weight of 5,000 to 100,000,
wherein the pigment comprises at least one of diketopyrrolopyrrole red pigment and phthalocyanine green pigment,
wherein the dispersant is a compound expressed by Structural Formula (11):

Structural Formula (11)

in which $A^1$ represents one of an alkyl group having 8 to 12 carbon atoms and which may be branched, an aryl group having 6 to 18 carbon atoms, a benzyl group, a styrenated phenol group, a distyrenated phenol group and a β-naphthyl group; k represents an integer of 5 to 30, and $M^1$ represents one of an alkali metal, ammonium, phosphonium and alkanolamine.

2. The recording ink according to claim 1, wherein the diketopyrrolopyrrole red pigment is at least one selected from C. I. pigment red 254, C. I. pigment red 255, C. I. pigment red 264 and C. I. pigment red 272.

3. The recording ink according to claim 1, wherein the phthalocyanine green pigment is at least one selected from C. I. pigment green 7 and C. I. pigment green 36.

4. The recording ink according to claim 1, wherein 1 part by mass to 100 parts by mass of the dispersant is added per 100 parts by mass of the pigment.

5. The recording ink according to claim 1, wherein the resin has an acid value is of 50KOHmg/g to 200KOHmg/g.

6. The recording ink according to claim 1, wherein the mass (X) of the dispersant and the mass (Y) of the solid content of the water-dissolved material or the water-dispersed material of at least one of acrylic resin, methacrylic resin, polyurethane resin and polyester resin in the recording ink satisfies the equation: $Y/X \leq 1$.

7. The recording ink according to claim 1, wherein the wetting agent is selected from 2-ethyl-1,3-hexanediol and 2,2,4-trimethyl-1,3-pentanediol.

8. The recording ink according to claim 1, wherein the water-soluble solvent is at least one selected from glycerin, diethylene glycol, 1,3-butanediol, 3-methyl-1,3-butanediol, triethylene glycol, 1,6-hexanediol, propylene glycol, 1,5-pentanediol, dipropylene glycol and trimethylol propane.

9. The recording ink according to claim 1, wherein the recording ink comprises a fluorochemical surfactant, and the fluorochemical surfactant is at least one selected from perfluoroalkyl sulfonates, perfluoroalkyl carbonates, perfluoroalkyl ethyleneoxide adducts and perfluoroalkyl betaines.

10. The recording ink according to claim 1, wherein the recording ink comprises polymer particles which have a volume average particle diameter of 5 nm to 200 nm, a film-forming performance after printing on a recording medium and a minimum film-forming temperature of 30° C. or less.

11. An ink set, comprising:
a recording ink which comprises:
a pigment,
a dispersant,
a water-soluble solvent,
a wetting agent, and
water,
in which the pigment comprises at least one of diketopyrrolopyrrole red pigment and phthalocyanine green pigment,
water-dissolved material or water-dispered material comprising at least one of an acrylic resin, methacrylic resin, polyurethane resin and a polyester resin, wherein the resin has a mass-average molecular weight of 5,000 to 100,000;
wherein the dispersant is a compound expressed by Structural Formula (11):

  Structural Formula (11)

in which $A^1$ represents one of an alkyl group having 8 to 12 carbon atoms and which may be branched, an aryl group having 6 to 18 carbon atoms, a benzyl group, a styrenated phenol group, a distyrenated phenol group and a β-naphthyl group; k represents an integer of 5 to 30, and $M^1$ represents one of an alkali metal, ammonium, phosphonium and alkanolamine;
wherein a red ink of 90% or more duty and a magenta ink of less than 10% duty are used simultaneously for printing a red color of 90% or more ink duty, and a red ink of 90% or more duty and a yellow ink of less than 10% duty are used simultaneously for printing a red color of less than 90% ink duty.

12. An ink cartridge, comprising:
a recording ink which comprises:
a pigment,
a dispersant,
a water-soluble solvent,
a wetting agent,
water, and
water-dissolved material or water-dispered material comprising at least one of an acrylic resin, methacrylic resin, polyurethane resin and a polyester resin, wherein the resin has a mass-average molecular weight of 5,000 to 100,000;
wherein the dispersant is a compound expressed by Structural Formula (11):

  Structural Formula (11)

in which $A^1$ represents one of an alkyl group having 8 to 12 carbon atoms and which may be branched, an aryl group having 6 to 18 carbon atoms, a benzyl group, a styrenated phenol group, a distyrenated phenol group and a β-naphthyl group; k represents an integer of 5 to 30, and $M^1$ represents one of an alkali metal, ammonium, phosphonium and alkanolamine;
in which the pigment comprises at least one of diketopyrrolopyrrole red pigment and phthalocyanine green pigment;
wherein the recording ink is contained in a container.

13. An inkjet recording apparatus, comprising:
an ink drop discharge unit configured to discharge recording ink drops by applying stimulation to a recording ink to record an image,
wherein the recording ink comprises:
a pigment,
a dispersant,
a water-soluble solvent,
a wetting agent, and
water,
water-dissolved material or water-dispered material comprising at least one of an acrylic resin, methacrylic resin, polyurethane resin and a polyester resin, wherein the resin has a mass-average molecular weight of 5,000 to 100,000;
wherein the dispersant is a compound expressed by Structural Formula (11):

  Structural Formula (11)

in which $A^1$ represents one of an alkyl group having 8 to 12 carbon atoms and which may be branched, an aryl group having 6 to 18 carbon atoms, a benzyl group, a styrenated phenol group, a distyrenated phenol group and a β-naphthyl group; k represents an integer of 5 to 30, and $M^1$ represents one of an alkali metal, ammonium, phosphonium and alkanolamine;
wherein the pigment comprises at least one of diketopyrrolopyrrole red pigment and phthalocyanine green pigment.

14. The inkjet recording apparatus according to claim 13, wherein the stimulation is at least one selected from heat, pressure, vibration and light.

15. An inkjet recording method, comprising:
discharging ink drops by applying stimulation to a recording ink to record an image,
wherein the recording ink comprises:
a pigment,
a dispersant,
a water-soluble solvent,
a wetting agent, and
water,
in which the pigment comprises at least one of diketopyrrolopyrrole red pigment and phthalocyanine green pigment;
wherein a red ink of 90% or more duty and a magenta ink of less than 10% duty are used simultaneously for printing a red color of 90% or more ink duty, and a red ink of 90% or more duty and a yellow ink of less than 10% duty are used simultaneously for printing a red color of less than 90% ink duty.

16. An inkjet recording method, comprising:
discharging ink drops by applying stimulation to each recording ink in an ink set to record an image,
wherein the ink set comprises:
a recording ink which comprises:
a pigment,
a dispersant,
a water-soluble solvent,
a wetting agent, and
water,
in which the pigment comprises at least one of diketopyrrolopyrrole red pigment and phthalocyanine green pigment, wherein the red ink of 90% or more duty and the magenta ink of less than 10% duty are used simultaneously for printing red color of 90% or more ink duty, and the red ink of 90% or more duty and the yellow ink of less than 10% duty are used simultaneously for printing red color of less than 90% ink duty.

17. The inkjet recording method according to claim 16, wherein the stimulation is at least one selected from heat, pressure, vibration and light.

18. An ink record, comprising:
an image recorded on a recording medium using a recording ink which comprises:
a pigment,
a dispersant,
a water-soluble solvent,
a wetting agent, and
water,
water-dissolved material or water-dispered material comprising at least one of an acrylic resin, methacrylic resin, polyurethane resin and a polyester resin, wherein the resin has a mass-average molecular weight of 5,000 to 100,000;
wherein the dispersant is a compound expressed by Structural Formula (11):

$A^1O-(CH_2CH_2O)_k-SO_3M^1$   Structural Formula (11)

in which $A^1$ represents one of an alkyl group having 8 to 12 carbon atoms and which may be branched, an aryl group having 6 to 18 carbon atoms, a benzyl group, a styrenated phenol group, a distyrenated phenol group and a β-naphthyl group; k represents an integer of 5 to 30, and $M^1$ represents one of an alkali metal, ammonium, phosphonium and alkanolamine;
in which the pigment comprises at least one of diketopyrrolopyrrole red pigment and phthalocyanine green pigment.

* * * * *